(12) United States Patent
Werner et al.

(10) Patent No.: US 11,964,430 B2
(45) Date of Patent: Apr. 23, 2024

(54) CONTROLLING IRRADIATION PARAMETERS OF AN ADDITIVE MANUFACTURING MACHINE

(71) Applicants: Concept Laser GmbH, Lichtenfels (DE); General Electric Company, Schenectady, NY (US)

(72) Inventors: Juergen Werner, Lichtenfels (DE); Benjamin Guenther, Lichtenfels (DE); Lisa Pastuschka, Coburg (DE); Manuel Acosta, Cincinnati, OH (US)

(73) Assignees: Concept Laser GmbH, Lichtenfels (DE); General Electric Company, Schenectady, NY (US)

( * ) Notice: Subject to any disclaimer, the term of this patent is extended or adjusted under 35 U.S.C. 154(b) by 294 days.

(21) Appl. No.: 17/459,044

(22) Filed: Aug. 27, 2021

(65) Prior Publication Data

US 2022/0080662 A1 Mar. 17, 2022

Related U.S. Application Data

(60) Provisional application No. 63/079,545, filed on Sep. 17, 2020.

(51) Int. Cl.
*B29C 64/268* (2017.01)
*B29C 64/153* (2017.01)
(Continued)

(52) U.S. Cl.
CPC .......... *B29C 64/268* (2017.08); *B29C 64/153* (2017.08); *B29C 64/393* (2017.08);
(Continued)

(58) Field of Classification Search
CPC ... B29C 64/268; B29C 64/153; B29C 64/393; B33Y 10/00; B33Y 30/00; B33Y 50/02;
(Continued)

(56) References Cited

U.S. PATENT DOCUMENTS 6,085,122 A 7/2000 Manning
6,492,651 B2 12/2002 Kerekes
(Continued)

OTHER PUBLICATIONS

Meng et al., "Machine Learning in Additive Manufacturing: A Review", JOM: The Journal of Minerals, vol. 72 No. 6, Apr. 17, 2020, pp. 1-32.
(Continued)

*Primary Examiner* — Michael J Brown
(74) *Attorney, Agent, or Firm* — Dority & Manning, P.A.

(57) ABSTRACT

A method of additively manufacturing three-dimensional objects, and/or a method of controlling one or more irradiation parameters of the energy beam system, may include determining an irradiation setting using an irradiation control model and outputting an irradiation control command to an energy beam system based at least in part on the irradiation setting. The irradiation control model may be configured to determine the irradiation setting based at least in part on a power density factor and/or an irradiation vector factor. The irradiation control command may be configured to change one or more irradiation parameters for additively manufacturing a three-dimensional object. An additive manufacturing system may include an energy beam system and a control system that includes an irradiation controller. The irradiation controller may include a control module configured to perform such a method.

18 Claims, 17 Drawing Sheets

(51) Int. Cl.
*B29C 64/393* (2017.01)
*B22F 10/36* (2021.01)
*B33Y 10/00* (2015.01)
*B33Y 30/00* (2015.01)
*B33Y 50/02* (2015.01)
*G06N 7/01* (2023.01)

(52) U.S. Cl.
CPC .............. *B33Y 10/00* (2014.12); *B33Y 30/00* (2014.12); *B33Y 50/02* (2014.12)

(58) Field of Classification Search
CPC ........ B22F 10/36; B22F 10/366; B22F 10/85; B22F 10/28; B22F 12/45; B22F 12/49; G06N 3/084; G06N 5/01; G06N 7/01; G06N 20/10; G06N 20/20; Y02P 10/25
USPC .......................................................... 700/98

See application file for complete search history.

(56) References Cited

U.S. PATENT DOCUMENTS

| | | |
|---|---|---|
| 6,501,061 B1 | 12/2002 | Kitai et al. |
| 7,467,939 B2 | 12/2008 | Sperry et al. |
| 9,341,467 B2 | 5/2016 | Snis |
| 9,723,866 B2 | 8/2017 | Lipson et al. |
| 9,952,236 B2 | 4/2018 | Satzger et al. |
| 2017/0239892 A1* | 8/2017 | Buller .................. B23K 26/702 |
| 2018/0253887 A1 | 9/2018 | Palmer et al. |
| 2019/0099952 A1 | 4/2019 | MacNeish, III et al. |
| 2019/0240775 A1 | 8/2019 | Graham et al. |
| 2019/0293608 A1 | 9/2019 | Ihn et al. |

OTHER PUBLICATIONS

Santo et al., "Optimizing Quality Inspection and Control in Powder Bed Metal Additive Manufacturing: Challenges and Research Directions", Proceedings of The IEEE, IEEE, New York, vol. 103 No. 4, 2021, pp. 326-346, (Abstract Only).

* cited by examiner

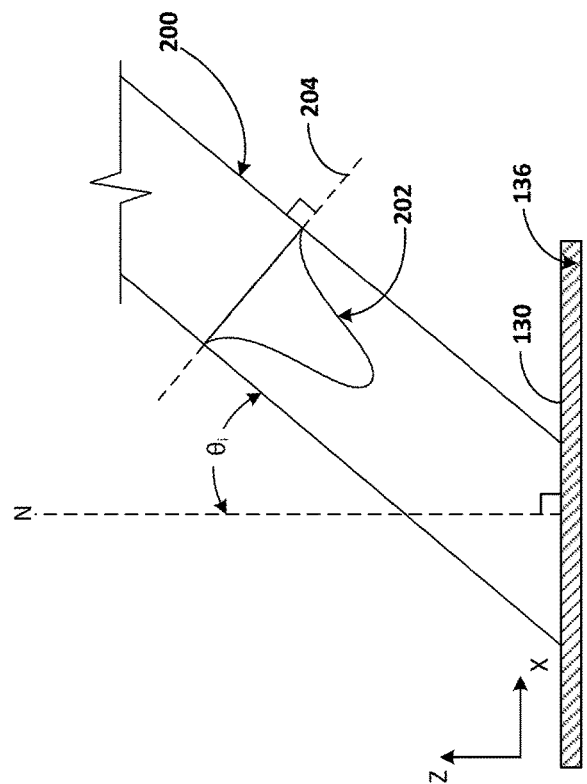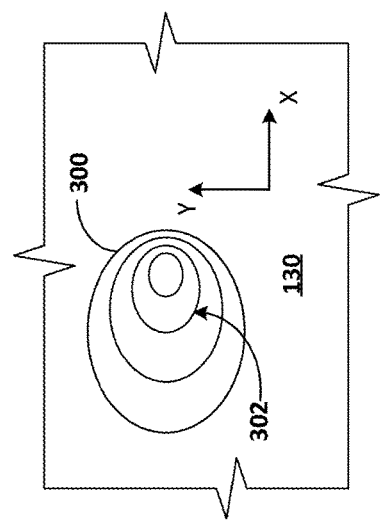
FIG. 3A  FIG. 3B
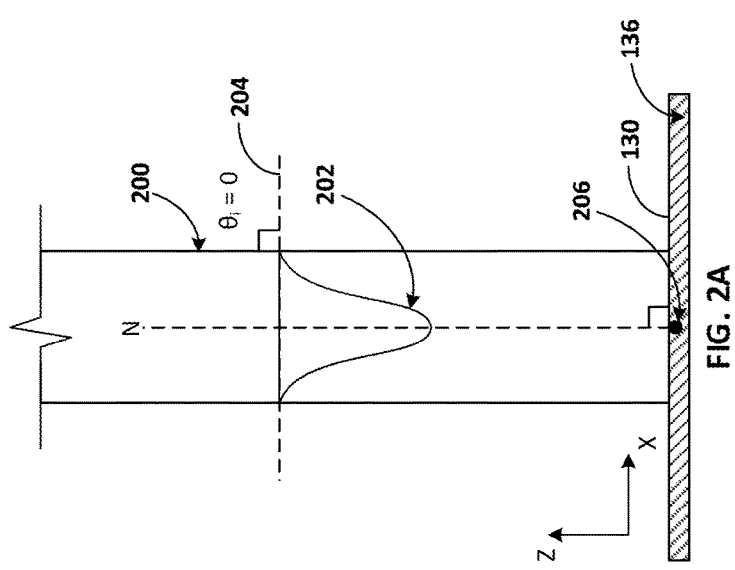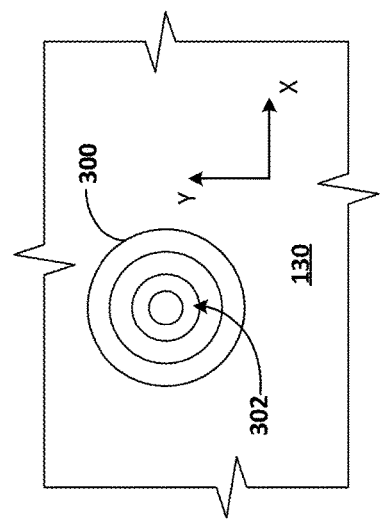
FIG. 2A  FIG. 2B

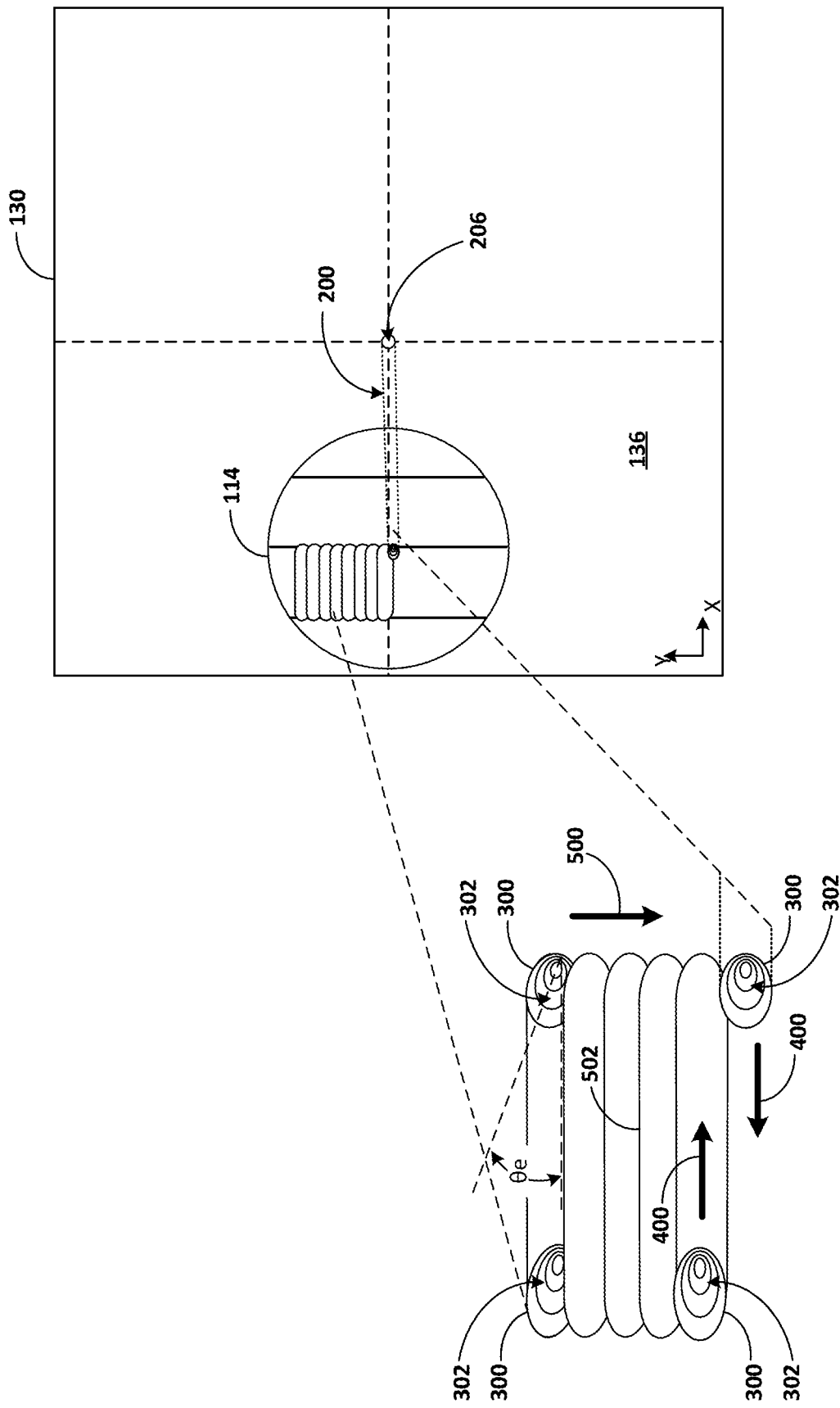

CONTROLLING IRRADIATION PARAMETERS OF AN ADDITIVE MANUFACTURING MACHINE

CROSS-REFERENCE TO RELATED APPLICATION

This application claims priority to U.S. Provisional App. Ser. No. 63/079,545, filed Sep. 17, 2020, the contents of which is incorporated herein by reference in its entirety as if set forth verbatim.

FIELD

The present disclosure generally pertains to additive manufacturing of three-dimensional objects. More particularly, the present disclosure pertains to systems and methods of controlling irradiation parameters for an additive manufacturing machine.

BACKGROUND

Additive manufacturing machines used to perform powder bed fusion typically have an energy beam system configured to selectively scan an energy beam across a build plane to irradiate sequential layers of a powder bed. The energy beam causes the selectively irradiated portions of the powder bed and/or underlying layers of an object being additively manufactured to melt and/or sinter, thereby forming a three-dimensional object as the sequential layers become selectively melted and/or sintered to one another.

The melting and/or sintering behavior of the powder bed may depend on one or more irradiation parameters, including beam parameters pertaining to the energy beam and/or scanning parameters pertaining to the manner in which the energy beam is scanned across the powder bed. For example, the melting and/or sintering behavior of the powder bed may depend on the intensity profile of the energy beam and/or the power density profile of a beam spot from the energy beam incident upon the build plane. Such intensity profile of the energy beam and/or such power density profile of the beam spot may depend on the angle of incidence of the energy beam and/or the location of the beam spot relative to a normal point on the build plane. Additionally, the melting and/or sintering behavior of the powder bed may depend on an irradiation vector of the energy beam, including, for example, an orientation of a irradiation vector relative to the normal point on the build plane and/or relative to previously irradiated beam paths. Differences in melting and/or sintering behavior may impact the quality of an object being additively manufactured, including physical properties of the object.

Accordingly, there exists a need for improved additive manufacturing systems and methods of controlling irradiation parameters of an additive manufacturing machine.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 2A and 2B respectively schematically depict an energy beam incident upon the build plane and corresponding beam spot on the build plane, representing an energy beam that is normal to the build plane;

FIGS. 3A and 3B respectively schematically depict another energy beam incident upon the build plane and corresponding beam spot on the build plane, representing an energy beam that is oblique to the build plane;

FIGS. 5A-5F schematically depict exemplary hatching vectors corresponding to a plurality of hatches applied to a build plane according to a respective plurality of scanning vectors;

Figure 1:
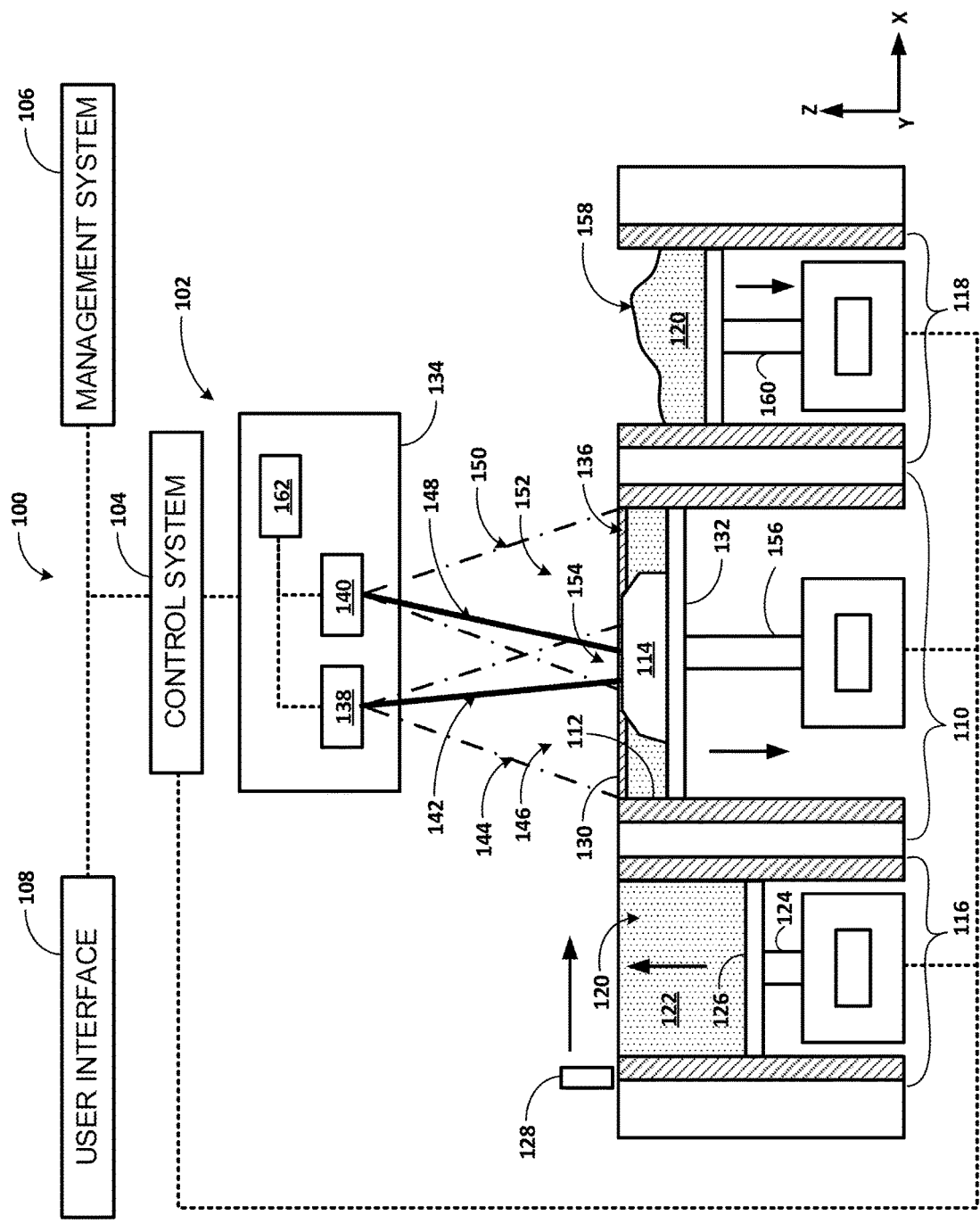
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As described herein, exemplary embodiments of the present subject matter involve the use of additive manufacturing machines or methods. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature, and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 µm and 200 µm, although the thickness may be selected based on any number of parameters and may be any suitable size according to alternative embodiments.

The present disclosure generally provides systems and methods of controlling an additive manufacturing machine, including controlling energy beam systems used to additively manufacture three-dimensional objects.

Exemplary systems and methods of controlling an additive manufacturing machine and/or an energy beam system may include determining an irradiation setting using an irradiation control model configured to determine the irradiation setting based at least in part on a power density factor and/or an irradiation vector factor. Exemplary systems and methods may include outputting an irradiation control command to an energy beam system based at least in part on the irradiation setting. The irradiation control command may be configured to control one or more irradiation parameters for additively manufacturing a three-dimensional object. Exemplary systems and methods may include controlling one or more irradiation parameters that may influence melting and/or sintering behavior of the powder bed, including systems and methods of controlling beam parameters that pertain to an actual or potential influence on melting and/or sintering behavior. Such influence on melting and/or sintering behavior may be attributable at least in part to an intensity profile, to an angle of incidence, and/or to one or more irradiation vectors of an energy beam (e.g., a scanning vector, a hatching vector, and/or a contour vector). Advantageously, the presently disclosed systems and methods may provide improved controllability of melting and/or sintering behavior, which, in turn, may improve quality, uniformity, and/or repeatability of additively manufactured objects, reduce object defects and/or aborted builds, and/or increase machine runnability.

As described herein, the energy imparted to the build plane by an energy beam may depend on a number of beam parameters, including, for example, the intensity or power of the energy beam, the intensity profile or power density profile of the energy beam, the spot size of the energy beam, the spot shape of the energy beam, the angle of incidence $\theta_i$ of the energy beam, and the scanning speed of the energy beam. These and/or other beam parameters can affect the melting and/or sintering behavior of the powder bed. Additionally, or in the alternative, the melting and/or sintering behavior of the powder bed may depend on an irradiation vector of the energy beam, such as in relation to the beam source and/or features of the build plane.

The angle of incidence $\theta_i$ of the energy beam may depend on the location on the build plane upon which the energy beam is directed. The power density profile of a resulting beam spot from the energy beam incident upon the build plane may depend on the angle of incidence $\theta_i$ of the energy beam and/or the location on the build plane upon which the energy beam is directed. For example, an exemplary energy beam may have a Gaussian intensity profile in the transverse plane that may be described by a Gaussian function. In the case of a circular Gaussian beam oriented normal to the build plane, the energy imparted to the build plane may similarly be described by a Gaussian function. The radially inward portion of a Gaussian beam spot may have a higher energy density than a radially outward portion of a Gaussian beam spot. The energy density may increase according to the Gaussian function in a radially inward direction. Likewise, the energy imparted to the build plane may be described by other nonlinear functions corresponding to respective beam intensity profiles.

In some embodiments, the surface area of a beam spot incident upon the build plane may depend on the angle of incidence $\theta_i$ of the energy beam. For example, energy imparted to the build plane from an energy beam with a Gaussian intensity profile and an oblique angle of incidence $\theta_i$ may have an elliptical Gaussian energy density profile. Consequently, in some embodiments, the energy density imparted to the build plane may depend upon the beam intensity profile in the transverse plane and/or the angle of incidence $\theta_i$ of the energy beam. Additionally, or in the alternative, in the case of a Gaussian beam that has an oblique angle of incidence $\theta_i$ to the build plane, the energy imparted to the build plane may be described by an elliptical Gaussian function, with the energy density skewed towards a normal point corresponding to a location on the build plane where the beam would be oriented normal to the build plane.

Thus, the melting and/or sintering behavior the powder bed may depend on the location of the build plane being irradiated by the energy beam, including the corresponding angle of incidence $\theta_i$ of the energy beam and/or the power density profile of a resulting beam spot from the energy beam. For example, the melting and/or sintering behavior of the powder bed may depend on the coordinates of the beam spot and resulting power density profile. Additionally, or in the alternative, the melting and/or sintering behavior of the powder bed may depend on the coordinates of the beam spot in relation to other features of the build plane, such as in relation to previously irradiated portions of the powder bed. The melting and/or sintering behavior of the powder bed may additionally or alternatively depend at least in part on the orientation of one or more irradiation vectors corresponding to one or more beam paths of an energy beam, such as in relation to the normal point and/or in relation to such other features of the build plane. For example, the melting and/or sintering behavior of the powder bed may depend at least in part on the orientation of one or more irradiation vectors (e.g., one or more scanning vectors, one or more hatching vectors, and/or one or more contour vectors), including the direction and/or magnitude of one or more of such irradiation vectors.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

As used herein, the term "normal point" refers to a location on the build plane corresponding to an energy beam where the energy beam, when incident upon the build plane, would be oriented normal to the build plane.

As used herein, the term "irradiation vector" or "irradiation vectors" refers individually or collectively, as the case may be, to one or more scanning vectors, one or more hatching vectors, and/or one or more contour vectors.

As used herein, the term "scanning vector" or "scanning vectors" refers individually or collectively, as the case may be, to a propagation entity of a beam path imparted by an energy beam across the build plane. A scanning vector has an orientation that includes both a magnitude component and a directional component. Generally, an additive manufacturing machine may form sequential layers of an object by directing an energy beam across the build plane, thereby defining a plurality of beam paths according to a corresponding plurality of scanning vectors that correspond to the regions of the build plane where the respective layers of the object are located.

In some embodiments, an energy beam may propagate across a build plane according to a plurality of scanning vectors corresponding to a series of beam paths that may be arranged in one or more groups of hatches that occupy a congruent region of the build plane. Additionally, or in the alternative, an energy beam may propagate across a build plane according to one or more scanning vectors corresponding to one or more beam paths a that may be arranged as a contour that respectively define at least a portion of a perimeter surrounding at least a portion of a congruent region of the build plane such as a congruent region of the build plane occupied by a plurality of hatches.

As used herein, the term "hatch" or "hatches" refers, individually, or in the plurality, as the case may be, to one or more beam paths from among a plurality of adjacent and/or partially overlapping beam paths that define a solidified congruent region of a build plane, such as a powder bed. By way of example, a layer of an object may be formed at least in part by a plurality of hatches that selectively solidify a corresponding congruent region of a powder bed.

As used herein, the term "hatching vector" refers to a propagation entity of a plurality of hatches imparted by a corresponding plurality of beam paths across the build plane. A hatching vector has an orientation that includes both a magnitude component and a directional component. Each individual hatch may be applied according to a respective scanning vector. By way of example, a series of hatches may be defined by a plurality of scanning vectors oriented with opposite directional components and such series of hatches may propagate across the build plane according to a hatching vector. Such hatching vector may have a directional component that is oblique to the corresponding plurality of scanning vectors, such as transverse or perpendicular to the corresponding plurality of scanning vectors.

As used herein, the term "contour" or "contours" refers, individually, or in the plurality, as the case may be, to one or more beam paths that define at least a portion of a perimeter region around at least a portion of a congruent region of a build plane, such as a perimeter of a congruent region defined by a plurality of hatches. A plurality of beam paths that respectively define a contour or contours may be adjacent or overlapping. By way of example, a perimeter region of an object may be formed at least in part by one or more contours that selectively solidify a corresponding perimeter region of a powder bed.

As used herein, the term "contour vector" refers to a propagation entity of one or more contours imparted by a corresponding one or more beam paths across the build plane. A contour vector has an orientation that includes both a magnitude component and a directional component. Each individual contour may be applied according to a respective scanning vector. By way of example, one or more contours may be defined by one or more scanning vectors and such one or more contours may propagate across the build plane according to a contour vector. Such contour vector may have a directional component that is parallel or oblique to the corresponding one or more scanning vectors. For example, a contour vector for a contour defined by a single beam path may be substantially equivalent to a scanning vector for such single beam path.

For purposes of convention, a component of an irradiation vector (e.g., a scanning vector, a hatching vector, and/or a contour vector) may be described in relation to X and Y coordinates. A directional component of an irradiation vector (e.g., a scanning vector, a hatching vector, and/or a contour vector) may include an X-directional component, a Y-directional component, or both an X-directional component and a Y-directional component. A magnitude component of an irradiation vector (e.g., a scanning vector, a hatching vector, and/or a contour vector) may include an X-magnitude component, a Y-magnitude component, or both an X-magnitude component and a Y-magnitude component. As used herein, the term "orientation" with respect to an irradiation vector (e.g., a scanning vector, a hatching vector, and/or a contour vector) is inclusive of the magnitude and direction of the vector.

Exemplary embodiments of the present disclosure will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130.

The additive manufacturing machine 102 includes an energy beam system 134 configured to generate a plurality of energy beams such as laser beams or electron beams, and to direct the respective energy beams onto the build plane 130 to selectively solidify respective portions of the powder bed 136 defining the build plane 130. As the respective energy beams selectively melt or fuse the sequential layers of powder material 120 that define the powder bed 136, the object 114 begins to take shape. Typically with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical componentry configured to direct the energy beam onto the build plane 130. For the embodiment shown in FIG. 1, the energy beam system 134 includes a first irradiation device 138 and a second irradiation device 140. In other embodiments, an energy beam system 134 may include three, four, six, eight, ten, or more irradiation devices. The plurality of irradiation devise may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane-region 146. The second irradiation device 140 may generate a second energy beam 148 that is scannable within a second scan field 150 incident upon at least a second build plane-region 152. The first scan field 144 and the second scan field 150 may overlap such that the first build plane-region 146 scannable by the first energy beam 142 overlaps with the second build plane-region 152 scannable by the second energy beam 148. The overlapping portion of the first build plane-region 146 and the second build plane-region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane 130 (e.g., the first build plane-region 146 and the second build plane-region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114.

As sequential layers of the powder bed 136 are melted or fused to one another, a build piston 156 gradually lowers the build platform 132 to make room for the recoater 128 to distribute sequential layers of powder material 120. As the build piston 156 gradually lowers and sequential layers of powder material 120 are applied across the build plane 130, the next sequential layer of powder material 120 defines the surface of the powder bed 136 coinciding with the build plane 130. Sequential layers of the powder bed 136 may be selectively melted or fused until a completed object 114 has been additively manufactured.

In some embodiments, an additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that in some embodiments an additive manufacturing machine may not utilize a powder module 116 and/or an overflow module 118, and that other systems may be provided for handling powder material 120, including different powder supply systems and/or excess powder recapture systems. However, the subject matter of the present disclosure may be practiced with any suitable additive manufacturing machine without departing from the scope hereof.

Still referring to FIG. 1, in some embodiments, an additive manufacturing machine 102 may include a monitoring system 162. The monitoring system 162 may be configured to detect a monitoring beam (not shown) such as an infrared beam from a laser diode and/or a reflected portion of an energy beam, and to determine one or more parameters associated with irradiating the sequential layers of the powder bed 136 based at least in part on the detected monitoring beam. For example, the one or more parameters associated with irradiating the sequential layers of the powder bed 136 may include irradiation parameters and/or object parameters, such as melt pool monitoring parameters. The one or more parameters determined by the monitoring system 162 may be utilized, for example, by the control system 104, to control one or more operations of the additive manufacturing machine 102 and/or of the additive manufacturing system 100. The monitoring system 162 may be configured to project a monitoring beam (not shown) and to detect a portion of the monitoring beam reflected from the build plane 130. Additionally, and/or in the alternative, the monitoring system 162 may be configured to detect a monitoring beam that includes radiation emitted from the build plane, such as radiation from an energy beam reflected from the powder bed 136 and/or radiation emitted from a melt pool in the powder bed 136 generated by an energy beam and/or radiation emitted from a portion of the powder bed 136 adjacent to the melt pool.

The monitoring system 162 may include componentry integrated as part of the additive manufacturing machine 102 and/or componentry that is provided separately from the additive manufacturing machine 102. For example, the monitoring system 162 may include componentry integrated as part of the energy beam system 134. Additionally, or in the alternative, the monitoring system 162 may include separate componentry, such as in the form of an assembly, that can be installed as part of the energy beam system 134 and/or as part of the additive manufacturing machine 102.

Referring now to FIGS. 2A and 2B, and 3A and 3B, an exemplary energy beam intensity profile and a corresponding energy density profile imparted to a build plane 130 will be described. FIGS. 2A and 3A show an energy beam 200 incident upon a build plane 130. The energy beam shown in FIG. 2A is normal to the build plane 130. The energy beam shown in FIG. 3A is oblique to the build plane. The energy beam 200 may be an energy beam from an additive manufacturing machine 102 such as the first energy beam 142 or the second energy beam 148 emitted from the energy beam system 134 of the additive manufacturing machine 102 shown in FIG. 1. FIGS. 2B and 3B show an energy density profile of a beam spot 300 from the energy beam 200 imparted to the build plane 130. The beam spot 300 in FIG. 2B corresponds to the energy beam 200 in FIG. 2A, and the beam spot 300 in FIG. 3B corresponds to the energy beam 200 in FIG. 3A respect.

The energy beam 200 has an intensity profile 202 in a transverse plane 204 that may be described by a nonlinear function. As used herein, the term "transverse plane" refers to a plane perpendicular to the direction of propagation of the energy beam 200. By way of example, the energy beam 200 may have a Gaussian intensity profile in the transverse plane 204 that may be described by a Gaussian function. Other intensity profiles are also contemplated, including super-Gaussian intensity profiles, astigmatic intensity profiles, "top hat" intensity profiles, Laguerre-Gaussian intensity profiles, bimodal or multi-modal intensity profiles, and so forth, which may be respectively described by corresponding functions.

The energy beam 200 is incident upon the build plane 130 at an angle of incidence $\theta_i$, as determined relative to a normal line N perpendicular to the build plane 130. As shown in FIG. 2A, the energy beam 200 is perpendicular to the build plane 130, and thus has an angle of incidence $\theta_i$ of zero (0). As shown in FIG. 3A, the energy beam 200 is oblique to the normal line N, and thus has an oblique angle of incidence $\theta_i$. As the energy beam 200 is scanned across the build plane 130 by the energy beam system 134, the angle of incidence $\theta_i$ may change. For example, an energy beam 200 may be normal to the build plane 130 when the energy beam 200 is incident upon a point on the build plane 130 that aligns (e.g., in the X,Y plane) with the optical center of the optical componentry of the irradiation device (e.g., the first irradiation device 138 or the second irradiation device 140) generating the energy beam 200. Such point on the build plane 130 corresponding to an energy beam 200 being normal to the build plane 130 is sometimes referred to as a normal point 206. may be normal to the build plane 130 The energy beam 200 may have an increasing angle of incidence $\theta_i$ as the energy beam 200 is scanned across points on the build plane 130 that are increasingly offset (e.g., in the X,Y, plane) from the optical center of the optical componentry of the irradiation device generating the energy beam 200.

As shown in FIG. 3A, the energy beam 200 imparts a circular spot 300 on the build plane 130 when the energy beam is normal to the build plane 130, corresponding to the energy beam 200 having a circular cross-section in the transverse plane 204. It will be appreciated, however, that other beam cross-sections are contemplated, including elliptical cross-sections and polygonal cross-sections. As shown in FIG. 3B, the energy beam 200 imparts an elliptical spot 300 in the build plane 130 when the energy beam is oblique to the build plane 130. The energy density of the beam spot 300 has an energy density profile 302 across the build plane 130 that may be described by a nonlinear function. The beam spot 300 shown in FIG. 2B has a Gaussian energy density profile 302 that may be described by a Gaussian function. The energy density of the beam spot 300 shown in FIG. 2B has a substantially annular distribution according to a Gaussian function, with an increasing energy density at progressively inward annular regions of the beam spot 300 and a decreasing energy density at progressively outward annular regions of the beam spot 300.

When the energy beam 200 has an oblique angle of incidence as shown in FIG. 3A, the energy beam imparts an elliptical beam spot 300 as shown in FIG. 3B. The elliptical beam spot 300 shown in FIG. 3B has an elliptical Gaussian energy density profile 302 that may be described by an elliptical Gaussian function that is askew towards the normal point 206. The beam spot 300 shown in FIG. 3B has a substantially elliptical annular distribution skewed towards the beam source, with an increasing energy density at progressively inward askew annular regions of the beam spot 300 and a decreasing energy density at progressively outward askew annular regions of the beam spot 300. It will be appreciated that other energy density profiles 302 are also contemplated, including super-Gaussian energy density profiles, astigmatic energy density profiles, "top hat" energy density profiles, Laguerre-Gaussian energy density profiles, bimodal or multi-modal energy density profiles, and so forth, which may be respectively described by corresponding functions.

By way of comparison, with reference to FIGS. 2B and 3B it will be appreciated that the beam spot 300 from the circular energy beam 200 shown in FIGS. 2A and 3B may become increasingly larger and/or increasingly elliptical with progressively larger angles of incidence $\theta_i$. Additionally, or in the alternative, the energy density imparted to the build plane 130 from the circular energy beam 200 shown in FIGS. 2A and 3B may become decreasingly lower and increasingly askew with progressively larger angles of incidence $\theta_i$. Consequently, in some embodiments, the melting and/or sintering behavior of a powder bed 136 may depend on the angle of incidence $\theta_i$ of the energy beam 200. For example, the melting and/or sintering behavior of a powder bed 136 may depend on shape of the beam spot 300, such as the ellipticity of the beam spot 300, corresponding to the angle of incidence $\theta_i$ of the energy beam 200. Additionally, or in the alternative, the melting and/or sintering behavior of a powder bed 136 may depend on the energy density of the beam spot 300 and/or the energy density profile 302 of the beam spot 300, such as the ellipticity and/or skewness of the energy density profile 302.

Figure 4B:
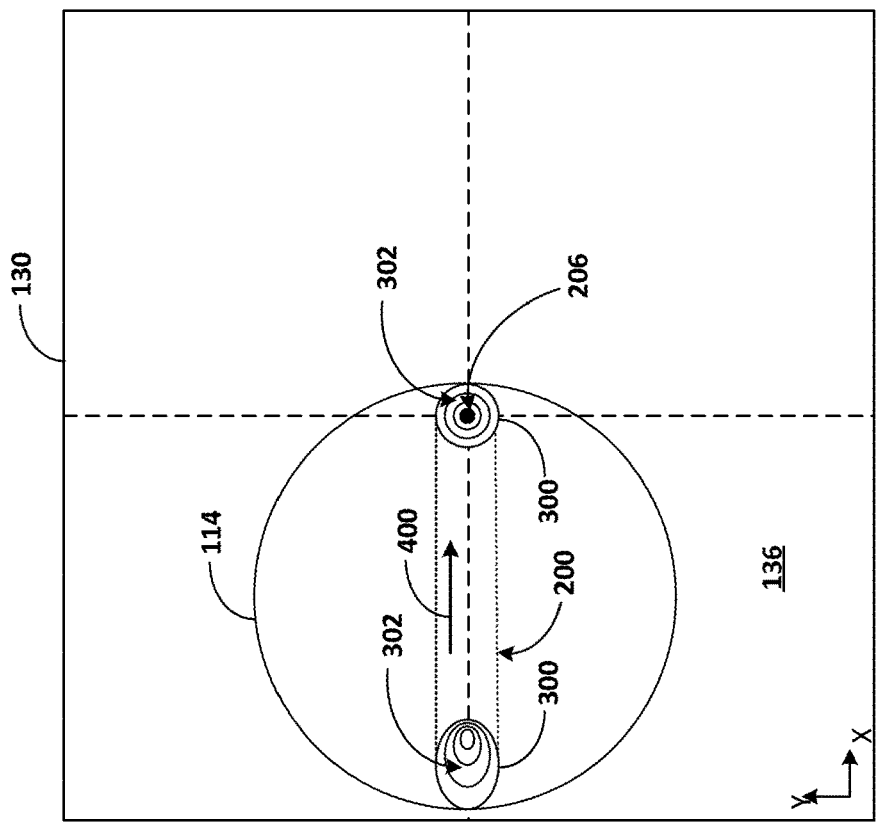
FIGS. 4A-4F schematically depicts exemplary scanning vectors of an energy beam across a build plane.
Figure 4A:
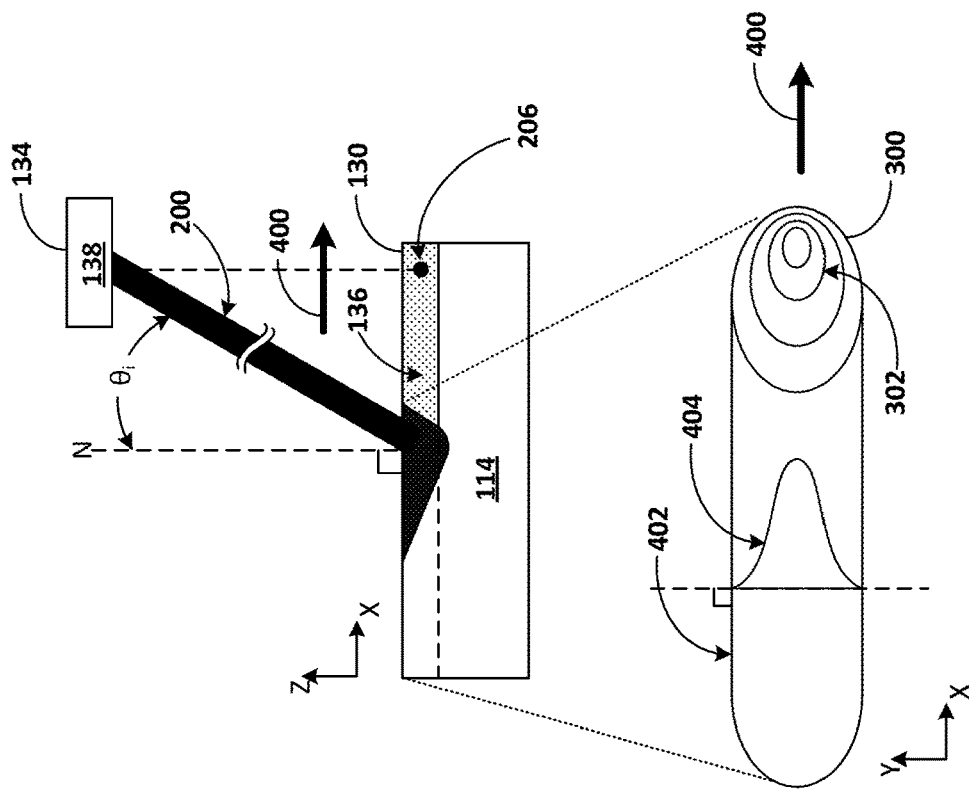
Figure 4D:
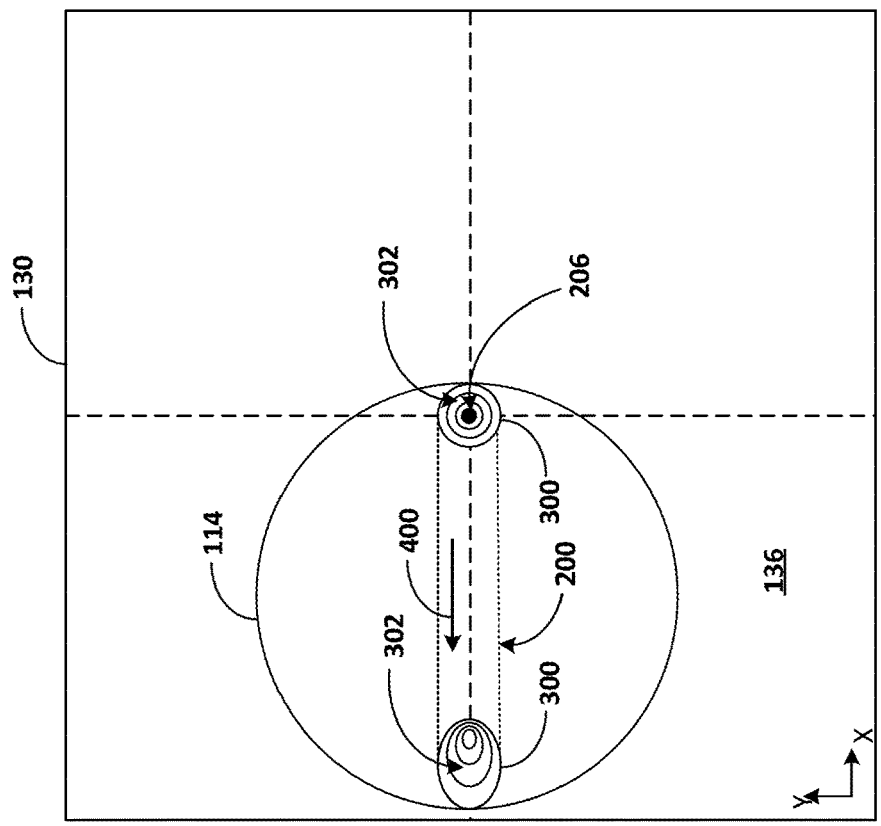
Figure 4C:
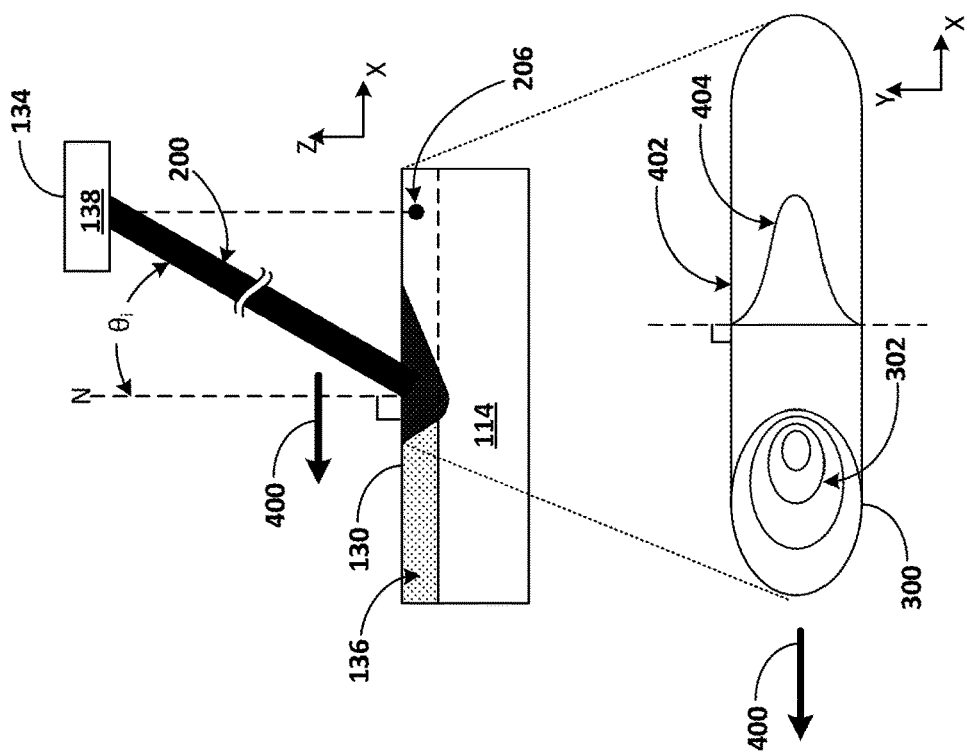
Figure 4F:
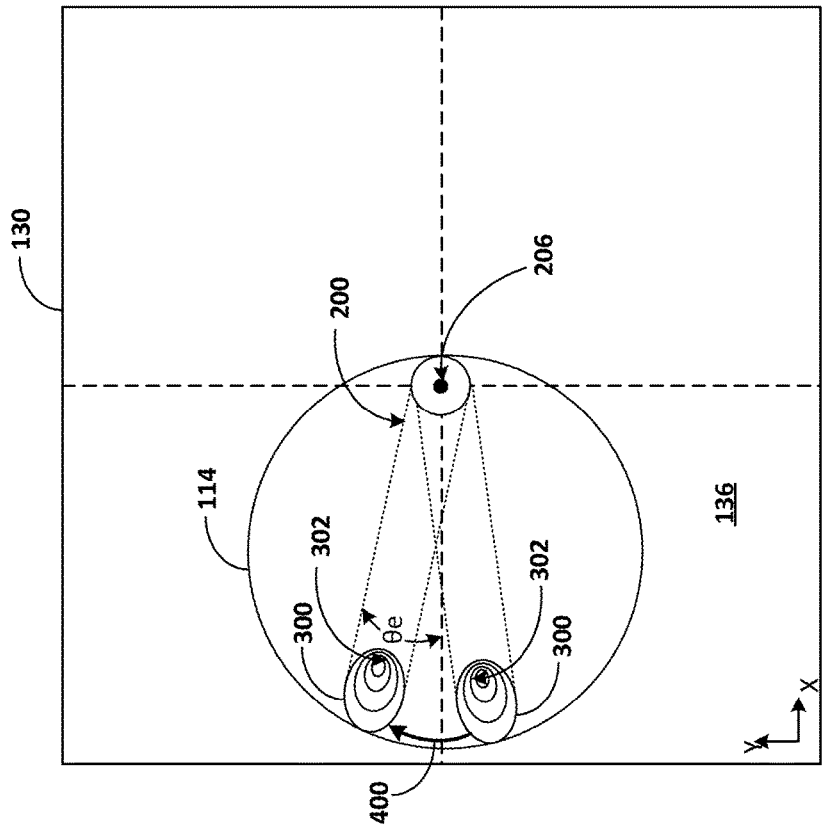
Figure 4E:
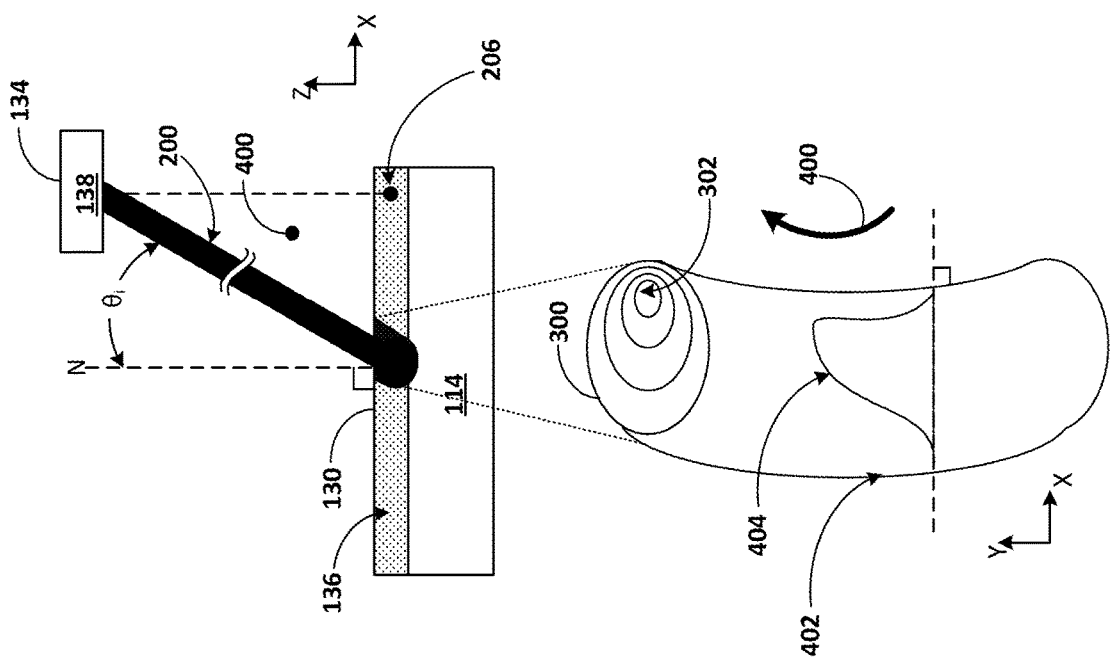

Referring now to FIGS. 4A-4F, exemplary scanning vectors 400 for an energy beam 200 will be described. In some embodiments, the melting and/or sintering behavior of a build plane 130 and/or of a powder bed 136 may depend on an orientation of a scanning vector 400 of an energy beam 200 across the build plane 130 and/or powder bed 136. FIGS. 4A-4F show an energy beam 200 propagating according to a respective scanning vector 400 oriented relative to a normal point 206 and a resulting beam path 402. FIG. 4A shows an energy beam 200 with a scanning vector 400 oriented towards a normal point 206. FIG. 4B shows a build plane 130 with a beam spot 300 from the energy beam 200 of FIG. 4A propagating across a powder bed 136 according to the scanning vector 400 shown in FIG. 4A. With the scanning vector 400 shown in FIGS. 4A and 4B, the angle of incidence $\theta_i$ of the energy beam 200 decreases as the energy beam 200 propagates along the scanning vector 400 and towards the normal point 206. FIG. 4C shows an energy beam with a scanning vector 400 oriented away from a normal point 206. FIG. 4D shows a build plane 130 with a beam spot 300 from the energy beam 200 of FIG. 4C propagating across a powder bed 136 according to the scanning vector 400 shown in FIG. 4C. With the scanning vector 400 shown in FIGS. 4C and 4D, the angle of incidence $\theta_i$ of the energy beam 200 increases as the energy beam 200 propagates along the scanning vector 400 and away from the normal point 206. FIG. 4E shows an energy beam with a scanning vector 400 oriented substantially equidistant from the normal point 206. By way of example, the scanning vector 400 shown in FIG. 4E may be oriented at a tangent or substantially tangent relative to the normal point 206. Additionally, or in the alternative, the scanning vector 400 shown in FIG. 4E may follow an annular or semi-annular path around the normal point. FIG. 4F shows a build plane 130 with a beam spot 300 from the energy beam 200 of FIG. 4E propagating across a powder bed 136 according to the scanning vector 400 shown in FIG. 4E. With the scanning vector 400 shown in FIGS. 4E and 4F, the angle of incidence $\theta_i$ of the energy beam 200 remains substantially constant as the energy beam 200 propagates along the scanning vector 400 substantially equidistant from the normal point 206.

As shown in FIGS. 4A-4F, when the energy beam 200 propagates along a scanning vector 400, the energy density profile 302 of the beam spot 300 may be skewed towards the normal point 206. As the energy beam 200 follows the scanning vector 400, energy may be imparted to the powder bed 136 according to a power density profile 404 oriented perpendicular to the scanning vector 400 that may be described by a nonlinear function. By way of example, the power density profile 404 may have a Gaussian power density profile that may be described by a Gaussian function. Other power density profiles 404 are also contemplated, including super-Gaussian power density profiles, astigmatic power density profiles, "top hat" power density profiles, Laguerre-Gaussian power density profiles, bimodal or multimodal power density profiles, and so forth, which may be respectively described by corresponding functions.

The power density profile 404 may depend at least in part on to the intensity profile 202 (FIGS. 2A and 3A) of the energy beam 200, the energy density profile 302 of the beam spot 300, the angle of incidence $\theta_i$ of the energy beam 200, the scanning speed of the energy beam 200, and/or the orientation of the scanning vector 400 relative to the normal point 206. and/or. For example, as depicted in FIGS. 4A-4F, energy may be imparted to the powder bed 136 with a power density profile 404 according an elliptical Gaussian function that is askew towards the normal point 206.

When the energy beam 200 propagates along a scanning vector 400 oriented towards the normal point 206, as shown in FIGS. 4A and 4B, the power density profile 404 may be oriented towards the normal point 206. The energy beam 200 following the scanning vector 400 shown in FIGS. 4A and 4B may impart more energy to a central portion of the beam path 402, for example, as a result of the orientation of the scanning vector 400 and/or the power density profile 404 being oriented towards the normal point 206. Additionally, or in the alternative, the energy density profile 302 of the beam spot 300 may be skewed towards the direction of the scanning vector 400. As a result, a leading portion of the beam spot 300 may expose the build plane 130 and/or the powder bed 136 to a relatively higher intensity and/or power density as compared to a trailing portion of the beam spot 300. As shown in FIG. 4B, the ellipticity of the beam spot 300 may decrease with decreasing angle of incidence $\theta_i$ of the energy beam 200, for example, as the energy beam 200 propagates along a scanning vector 400 oriented towards the normal point 206. The skewness of the energy density profile 302 may correspondingly decrease with the decreasing angle of incidence $\theta_i$ of the energy beam 200 and/or decreasing ellipticity of the beam spot 300.

When the energy beam 200 propagates along a scanning vector 400 oriented away from the normal point 206, as shown in FIGS. 4C and 4D, the power density profile 404 may be oriented away from the normal point 206. The energy beam 200 following the scanning vector 400 shown in FIGS. 4C and 4D may impart more energy to a central portion of the beam path 402, for example, as a result of the orientation of the scanning vector 400 and/or the power density profile 404 being oriented away from the normal point 206. Additionally, or in the alternative, the energy density profile 302 of the beam spot 300 may be skewed away from the direction of the scanning vector 400. As a result, a leading portion of the beam spot 300 may expose the build plane 130 and/or the powder bed 136 to a relatively lower intensity and/or power density as compared to a trailing portion of the beam spot 300. Thus, an energy beam 200 following a scanning vector 400 oriented away from the normal point 206, as shown in FIGS. 4C and 4D, may impart a relatively more gradually transitioning intensity and/or power density as the beam spot 300 passes over a point on the build plane 130 and/or powder bed 136, as compared to an energy beam 200 following a scanning vector 400 oriented towards the normal point 206, as shown in FIGS. 4A and 4B. As shown in FIG. 4D, the ellipticity of the beam spot 300 may increase with increasing angle of incidence $\theta_i$ of the energy beam 200, for example, as the energy beam 200 propagates along a scanning vector 400 oriented away from the normal point 206. The skewness of the energy density profile 302 may correspondingly increase with the increasing angle of incidence $\theta_i$ of the energy beam 200 and/or increasing ellipticity of the beam spot 300.

When the energy beam 200 propagates along a scanning vector 400 oriented substantially equidistant from the normal point 206, as shown in FIGS. 4E and 4F, the power density profile 404 may be oriented transverse to the normal point 206 and/or skewed towards the normal point 206. For example, the peak of the power density profile 404 may be oriented transverse to the normal point 206. Additionally, or in the alternative, the median power density of the power density profile 404 may be skewed towards the normal point 206. The energy beam 200 following the scanning vector 400 shown in FIGS. 4E and 4F may impart more energy to an off-center portion of the beam path 402, skewed towards the normal point 206, for example, as a result of the orientation of the scanning vector 400 and/or the power density profile 404 being oriented transverse to the normal point 206. Additionally, or in the alternative, the energy density profile 302 of the beam spot 300 may be skewed towards the direction of the scanning vector 400. As a result, an inward-oriented side of the beam spot 300 may expose the build plane 130 and/or the powder bed 136 to a relatively higher intensity and/or power density as compared to an outward-oriented portion of the beam spot 300. As shown in FIGS. 4E and 4F, the elliptical angle $\theta_e$ of the beam spot 300 may change as a result of changing coordinates of the beam spot 300 relative to the normal point 206 as the energy beam 200 propagates along a scanning vector 400 substantially equidistant to the normal point 206. With the beam spot 300 remaining substantially equidistant from the normal point 206, the angel of incidence $\theta_i$ of the energy beam 200 may remain substantially constant. The skewness of the energy density profile 302 may correspondingly rotate, for example, for example, while the degree of skewness remains substantially constant, such that the energy density profile 302 remains skewed towards the normal point 206. Additionally, or in the alternative, the power density profile 404 may correspondingly rotate, for example, while the skewness of the median power density of the power density profile 404 remains substantially constant, such that the power density profile 404 remains oriented transverse to the normal point 206 and/or such that the median power density of the power density profile 404 remains skewed towards the normal point 206.

Now turning to FIGS. 5A-5G, exemplary hatching vectors 500 (FIGS. 5A-5F) and contour vectors 550 (FIG. 5G) will be described. As will be described, the melting and/or sintering behavior of the build plane 130 and/or powder bed 136 may depend on the orientation of a hatching vector 500 of an energy beam 200 across the build plane 130 and/or powder bed 136. Additionally, or in the alternative, the melting and/or sintering behavior of the build plane 130 and/or powder bed 136 may depend on the orientation of a contour vector 550 of an energy beam 200 across the build plane 130 and/or powder bed 136. One or more hatches 502 respectively formed by a plurality of adjacent and/or partially overlapping beam paths 402 may define a solidified congruent region of a build plane 130, such as a layer of an object 114. The one or more hatches 502 may respectively propagate across the build plane 130, such as the layer of the object 114, in a propagation direction according to a hatching vector 500. Each individual hatch 502 may be applied according to a respective scanning vector 400. In some embodiments, a hatching vector 500 may be transverse to a corresponding plurality of scanning vectors 400 that define a plurality of hatches. In the embodiments depicted, a plurality of hatches 502 may be formed by corresponding scanning vectors 400 oriented, for example, in a series of alternating directions, with a hatching vector 500 propagating transverse to the hatches. It will be appreciated, however, that other hatching methodologies are contemplated with corresponding other scanning vectors 400 and/or hatching vectors 500.

One or more contours 552 respectively formed by one or more beam paths 402 may define a solidified perimeter region around at least a portion of a congruent region of a build plane 130, such as a perimeter of an object 114. For example, one or more contours 552 may define a solidified perimeter surrounding at least a portion of a congruent region of a build plane 130 that has been solidified by a plurality of hatches 502 and/or that is subsequently solidified by a plurality of hatches 502. The one or more contours 552 may respectively propagate across the build plane 130, such as the layer of the object 114, in a propagation direction according to a contour vector 550. Each individual contour 552 may be applied according to a respective scanning vector 400. In some embodiments, a contour vector 550 may be perpendicular (e.g., adjacent and/or overlapping) a corresponding one or more scanning vectors 400 that define one or more contours 552. Additionally, or in the alternative, a contour vector 550 may be transverse to a corresponding plurality of scanning vectors 400 that define a plurality of contours 552. In the embodiments depicted, one or more contours 552 may be formed by a corresponding one or more scanning vectors 400, with a contour vector 550 propagating perpendicular (e.g., adjacent and/or overlapping) to the one or more scanning vectors 400. In the case of a plurality of contours 552, the corresponding plurality of scanning vectors 400 may be oriented, for example, in the same direction or in alternating directions. It will be appreciated, however, that other irradiation methodologies are contemplated with corresponding other scanning vectors 400 and/or contour vectors 550.

In some embodiments, the melting and/or sintering behavior of a powder bed 136 may depend on an orientation of a hatching vector 500 of an energy beam 200 across the build plane 130. Additionally, or in the alternative, the melting and/or sintering behavior of a powder bed 136 may depend on an orientation of a contour vector 550 of an energy beam 200 across the build plane 130. FIGS. 5A-5F show an energy beam 200 propagating according to a scanning vector 400 to apply a series of hatches 502. The series of hatches 502 provide a corresponding hatching vector 500 propagating across a build plane 130 and/or powder bed 136 relative to a normal point 206.

Figure 5A:
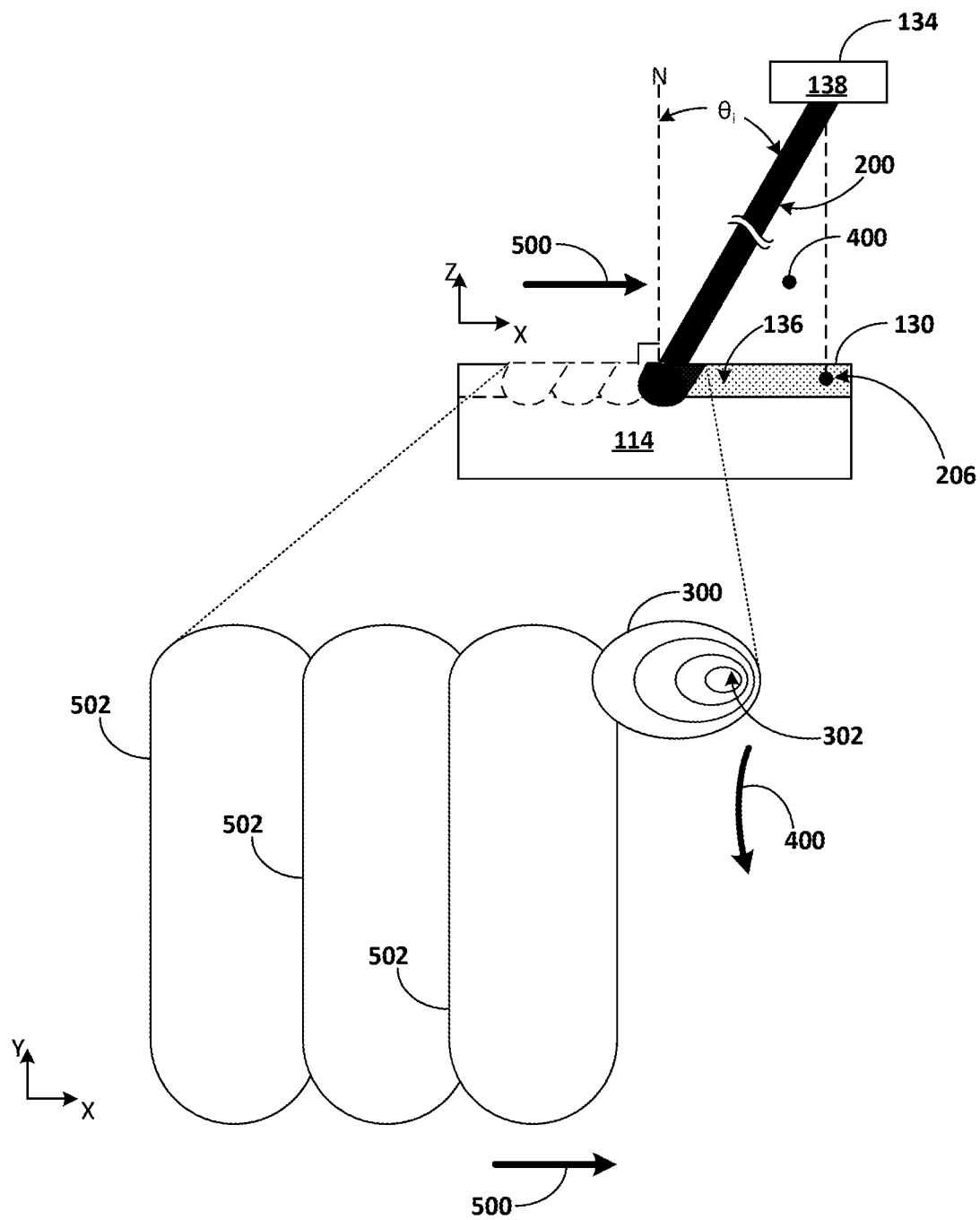
Figure 5B:
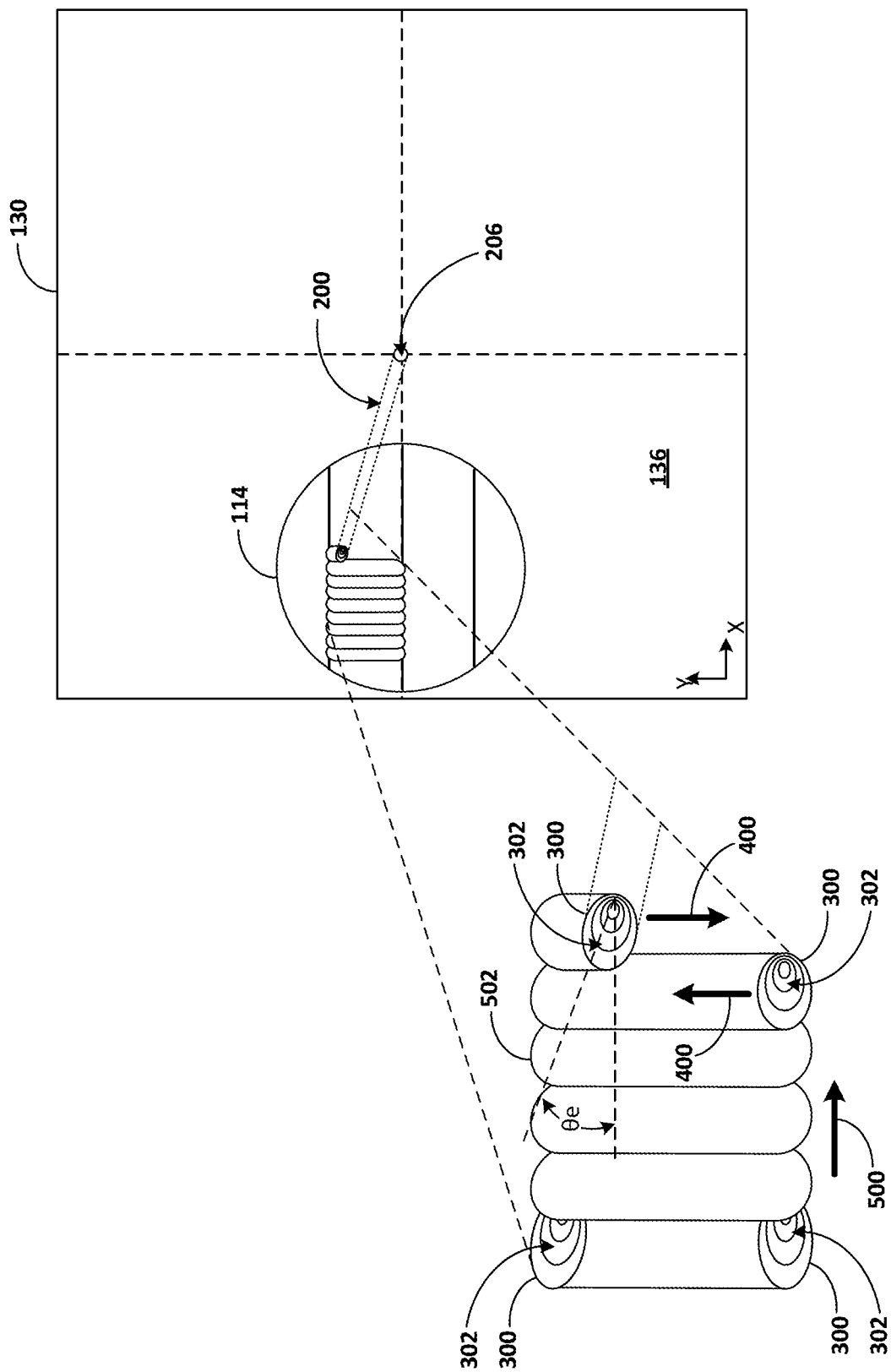

FIGS. 5A and 5B show a hatching vector 500 oriented towards a normal point 206. The hatching vector 500 shown in FIGS. 5A and 5B correspond to a series of hatches 502 applied according to corresponding scanning vectors 400 respectively oriented substantially equidistant from the normal point 206. The scanning vectors 400 and resulting hatches 502 may be linear, indicated by linear hatches 502 as shown, and/or curved, indicated by the scanning vector 400 as shown. By way of example, the scanning vectors 400 corresponding to the series of hatches 502 shown in FIGS. 5A and 5B may be oriented at a tangent or substantially tangent relative to the normal point 206. With the hatching vector 500 shown in FIGS. 5A and 5B, the angle of incidence $\theta_i$ of the energy beam 200 decreases as the hatching vector 500 propagates towards the normal point 206.

Figure 5C:
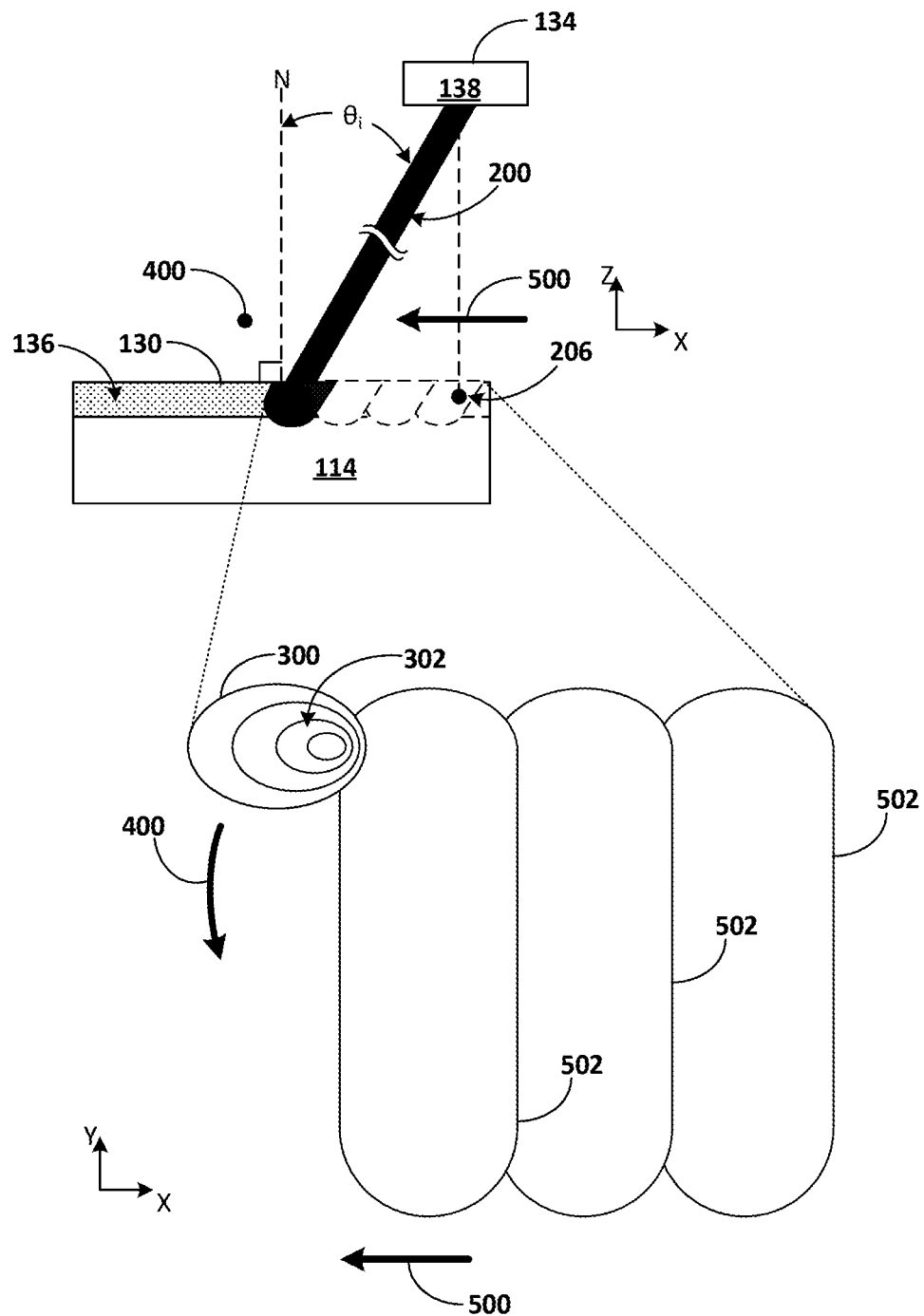
Figure 5D:
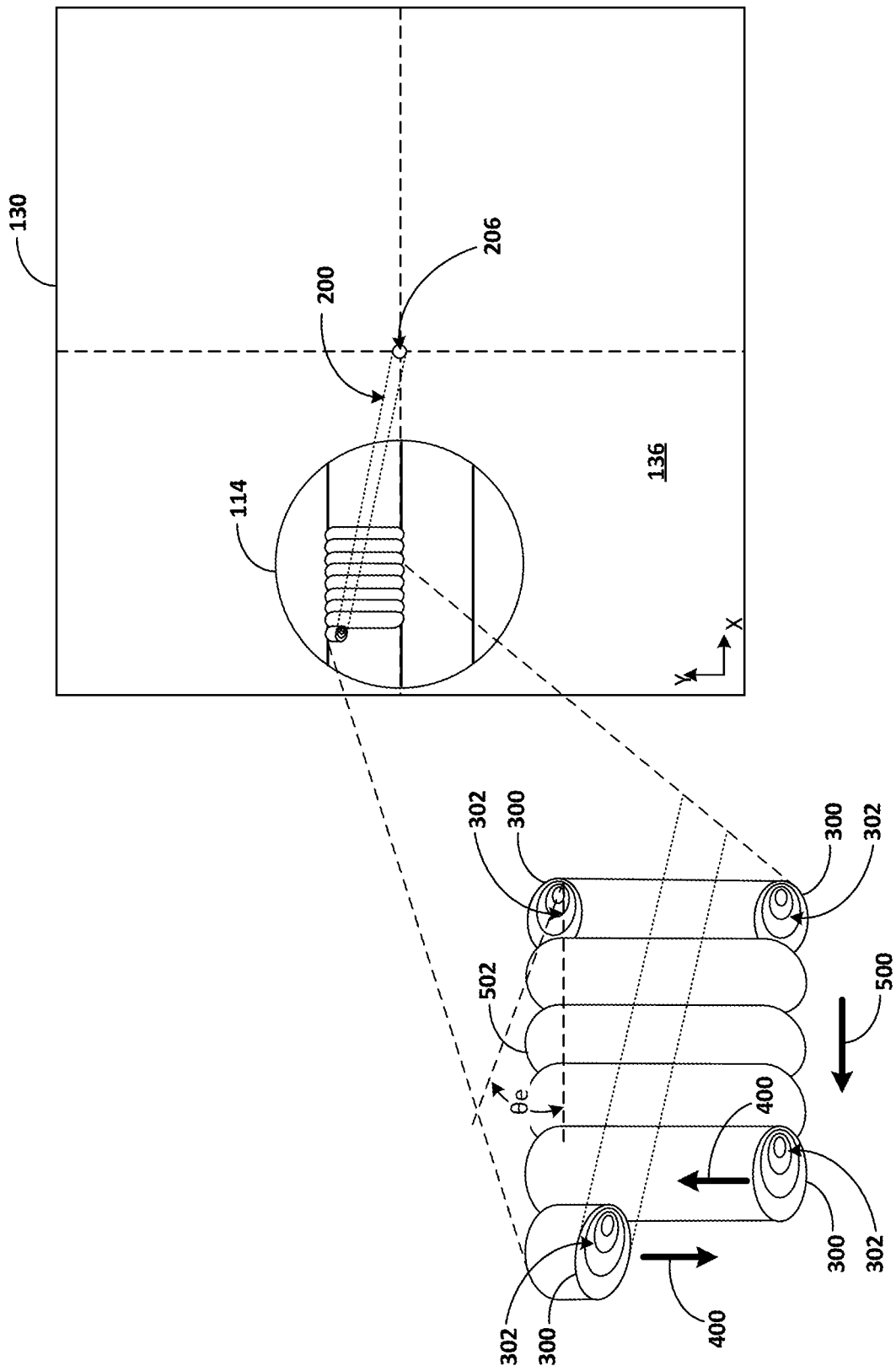

FIGS. 5C and 5D show a hatching vector 500 oriented away from a normal point 206. The hatching vector 500 shown in FIGS. 5C and 5D correspond to a series of hatches 502 applied according to corresponding scanning vectors 400 respectively oriented substantially equidistant from the normal point 206. The scanning vectors 400 and resulting hatches 502 may be linear, indicated by linear hatches 502 as shown, and/or curved, indicated by the scanning vector 400 as shown. By way of example, the scanning vectors 400 corresponding to the series of hatches 502 shown in FIGS. 5C and 5D may be oriented at a tangent or substantially tangent relative to the normal point 206. With the hatching vector 500 shown in FIGS. 5C and 5D, the angle of incidence $\theta_i$ of the energy beam 200 increases as the hatching vector 500 propagates away from the normal point 206.

Figure 5E:
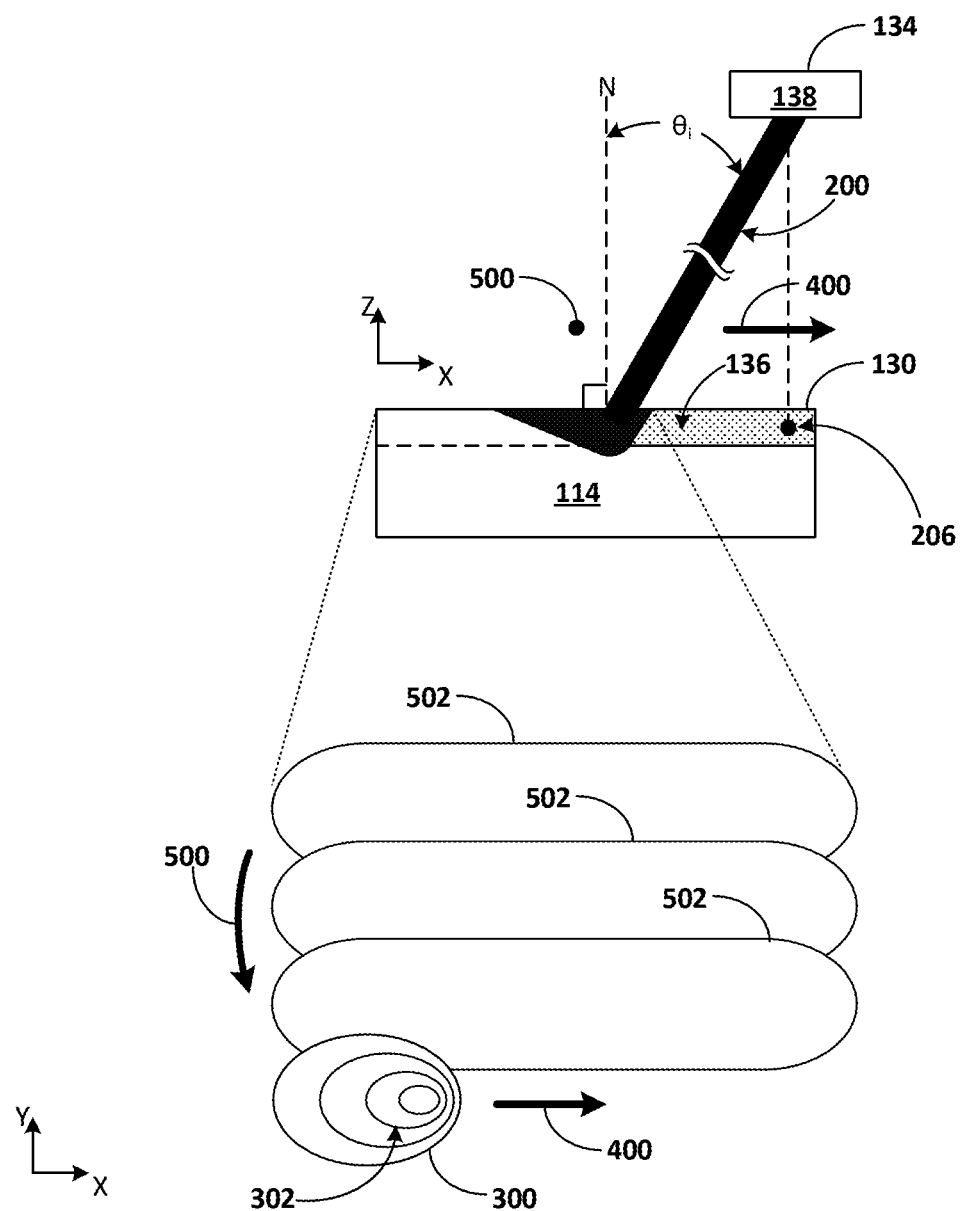

FIGS. 5E and 5F show a hatching vector 500 oriented at substantially equidistant from the normal point 206. By way of example, the hatching vector 500 shown in FIGS. 5E and 5F may be oriented at a tangent or substantially tangent relative to the normal point 206. The scanning vectors 400 and resulting hatches 502 may be oriented towards or substantially towards the normal point 206. In some embodiments, the scanning vectors 400 and resulting hatches 502 may be oriented radially or substantially radially relative to the normal point 206. For example, at least one hatch 502 and corresponding scanning vector 400 may be oriented towards or away from the normal point 206, while adjacent hatches 502 and corresponding scanning vectors 400 may be laterally offset by a distance corresponding to a hatch width, which may include an overlap or an offset. With the hatching vector 500 shown in FIGS. 5E and 5F, the angle of incidence $\theta_i$ of the energy beam 200 remains substantially consistent as the hatching vector 500 propagates along substantially equidistant from the normal point 206.

As shown in FIGS. 5A-5F, the ellipticity of a beam spot 300 may change as a result of changing angle of incidence $\theta_i$ of the energy beam 200 as the energy beam 200 propagates along a scanning vector 400 corresponding to a given hatch 502 and/or as the respective hatches 502 propagate along the hatching vector 500. Additionally, or in the alternative, the elliptical angle $\theta_e$ of the beam spot 300 may change as a result of changing coordinates of the beam spot 300 relative to the normal point 206 as the energy beam 200 propagates along a scanning vector 400 corresponding to a given hatch 502 and/or as the respective hatches 502 propagate along the hatching vector 500. Additionally, or in the alternative, the melting and/or sintering behavior of the respective hatches 502 and/or the powder bed 136 may change as the energy beam 200 propagates along a scanning vector 400 corresponding to a given hatch 502 and/or as the respective hatches 502 propagate along the hatching vector 500. For example, the melting and/or sintering behavior of the respective hatches 502 and/or the powder bed may depend at least in part on the angle of incidence $\theta_i$ of the energy beam 200 and/or elliptical angle $\theta_e$ of the beam spot 300 corresponding to the current hatch 502 and/or to one or more previous hatches 502, such as the previous hatch 502 being overlapped by the current hatch 502.

With the hatches 502 shown in FIG. 5B, the ellipticity of the beam spot 300 decreases as the hatches 502 propagate along the hatching vector 500 towards the normal point 206, while the elliptical angle $\theta_e$ of the beam spot 300 varies as the respective hatches 502 propagate along the corresponding scanning vector 400. Consequently, the energy density and/or power density imparted by the energy beam 200 may increase as the respective hatches propagate along the hatching vector 500 towards the normal point 206. As shown in FIG. 5B, a portion of the beam spot 300 overlapping a previous hatch 502 may have a lower power density than a portion of the beam spot 300 incident upon the powder bed 136. Additionally, or in the alternative, the energy density imparted to the portion of the previous hatch 502 being overlapped by the beam spot 300 may be greater than the energy density of the portion of the beam spot 300 overlapping the previous hatch 502. As the hatches 502 propagate along the hatching vector 500, and the angle of incidence $\theta_i$ of the energy beam 200 correspondingly decreases, the difference in energy density and/or power density may become less pronounced as between the portion of the previous hatch 502 being overlapped by the beam spot 300 and the portion of the beam spot 300 overlapping the previous hatch 502.

With the hatches 502 shown in FIG. 5D, the ellipticity of the beam spot 300 increases as the hatches 502 propagate along the hatching vector 500 away from the normal point 206, while the elliptical angle $\theta_e$ of the beam spot 300 varies as the respective hatches 502 propagate along the corresponding scanning vector 400. Consequently, the energy density and/or power density imparted by the energy beam 200 may decrease as the respective hatches propagate along the hatching vector 500 away from the normal point 206. As shown in FIG. 5D, a portion of the beam spot 300 overlapping a previous hatch 502 may have a greater power density than a portion of the beam spot 300 incident upon the powder bed 136. Additionally, or in the alternative, the energy density imparted to the portion of the previous hatch 502 being overlapped by the beam spot 300 may be lower than the energy density of the portion of the beam spot 300 overlapping the previous hatch 502. As the hatches 502 propagate along the hatching vector 500, and the angle of incidence $\theta_i$ of the energy beam 200 correspondingly increases, the difference in energy density and/or power density may become more pronounced as between the portion of the previous hatch 502 being overlapped by the beam spot 300 and the portion of the beam spot 300 overlapping the previous hatch 502.

With the hatches 502 shown in FIG. 5F, the elliptical angle $\theta_e$ of the beam spot 300 decreases as the hatches 502 propagate along the hatching vector 500, while the ellipticity of the beam spot 300 varies as the respective hatches 502 propagate along the corresponding scanning vector 400. Consequently, the energy density and/or power density imparted by the energy beam 200 may change (e.g., decrease and/or increase, such as alternatingly decrease and increase) as the respective hatches 502 propagate along the respective scanning vectors 400 away from and/or towards the normal point 206. As shown in FIG. 5F, a portion of the beam spot 300 overlapping a previous hatch 502 may have a greater power density than a portion of the beam spot 300 incident upon the powder bed 136. Additionally, or in the alternative, the energy density imparted to the portion of the previous hatch 502 being overlapped by the beam spot 300 may be lower than the energy density of the portion of the beam spot 300 overlapping the previous hatch 502. As the hatches 502 propagate along the hatching vector 500, and the angle of incidence $\theta_i$ of the energy beam 200 correspondingly increases, the difference in energy density and/or power density may become more pronounced as between the portion of the previous hatch 502 being overlapped by the beam spot 300 and the portion of the beam spot 300 overlapping the previous hatch 502.

Figure 5G:
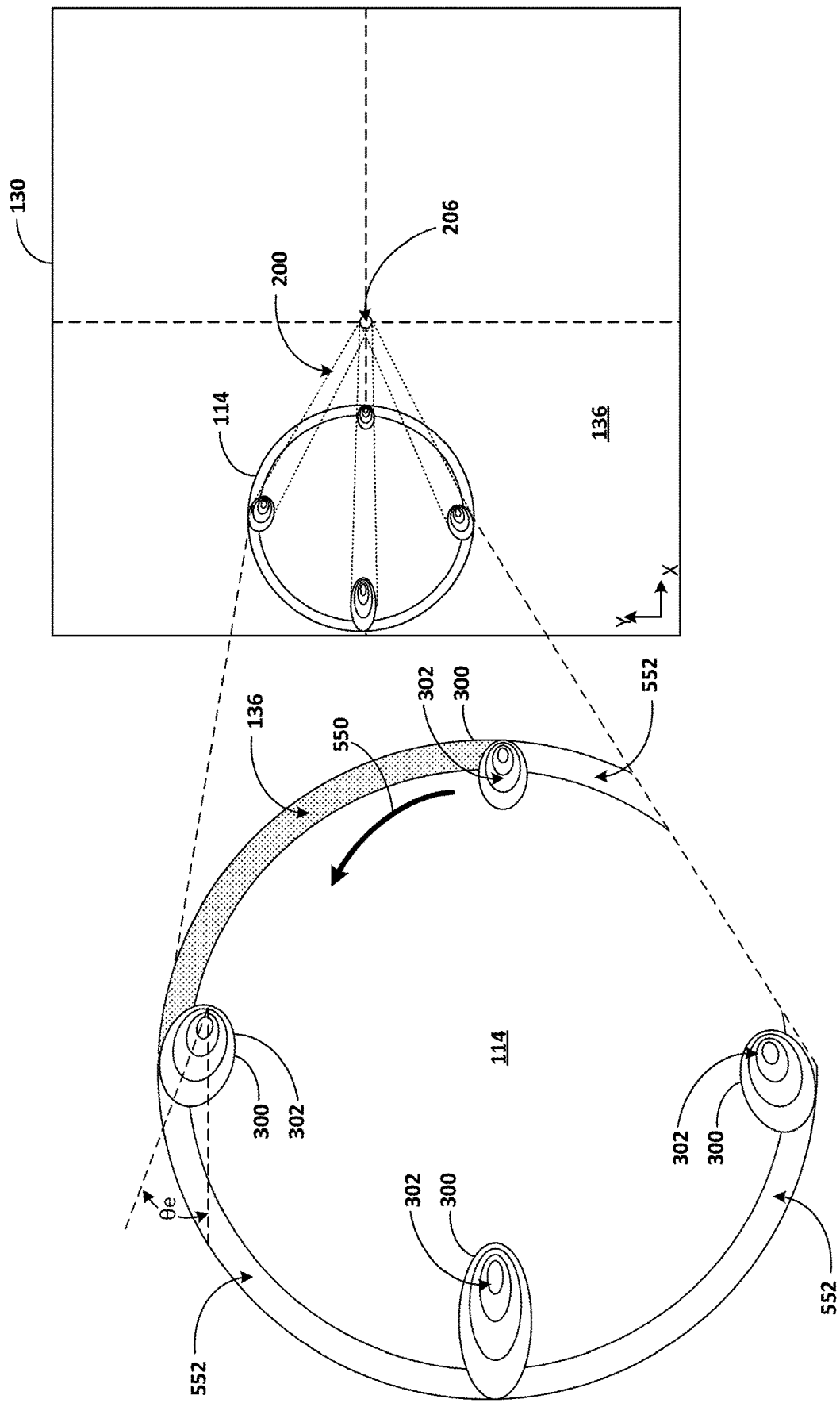
FIG. 5G schematically depicts an exemplary contour vectors corresponding to one or more contours applied to a build plane according to a respective one or more scanning vectors.

FIG. 5G shows a contour vector 550 and corresponding contour 552 at least partially surrounding a perimeter of a layer of an object 114. With the contour vector 550 shown in FIG. 5G, the angle of incidence $\theta_i$ of the energy beam 200 varies continuously as the contour vector 552 propagates around the perimeter of the layer of the object 114. As shown in FIG. 5G, the ellipticity of a beam spot 300 may change as a result of changing angle of incidence $\theta_i$ of the energy beam 200 as the energy beam 200 propagates along a scanning vector 400 corresponding to a given contour 552 and/or as the respective contour 552 propagate along the contour vector 550. Additionally, or in the alternative, the elliptical angle $\theta_e$ of the beam spot 300 may change as a result of changing coordinates of the beam spot 300 relative to the normal point 206 as the energy beam 200 propagates along a scanning vector 400 corresponding to a given contour 552 and/or as the respective contour 552 propagate along the contour vector 550. Consequently, the energy density profile 302 and/or the power density profile 404 of a beam spot 300 may change as the energy beam 200 propagates along a scanning vector 400 corresponding to a given contour 552 and/or as the respective contour 552 propagates along the contour vector 550. Additionally, or in the alternative, the melting and/or sintering behavior of the respective contours 552, the hatches 502 adjacent to the contours 552, and/or the powder bed 136, may change as the energy beam 200 propagates along a scanning vector 400 corresponding to a given contour 552 and/or as the respective contour 552 propagate along the contour vector 550. For example, the melting and/or sintering behavior of the respective contours 552, the hatches 502 adjacent to the contours 552, and/or the powder bed 136, may depend at least in part on the angle of incidence $\theta_i$ of the energy beam 200 and/or elliptical angle $\theta_e$ of the beam spot 300 corresponding to the current contour 552 and/or to one or more previous contours 552 and/or one or more previous hatches 502, such as the previous contour 552 and/or hatch 502 being overlapped by the current contour 552.

Now turning to FIG. 6, and exemplary control system 104 will be described. In some embodiments, a control system 104 may be configured to output one or more control commands associated with an additive manufacturing machine 102. The control commands may include irradiation control commands. An irradiation control command may be configured to control one or more irradiation parameters, including one or more beam parameters and/or one or more scanning parameters. The one or more irradiation parameters may be controlled, for example, based at least in part on one or more model inputs. The irradiation control commands may be configured to impart a desired melting and/or sintering behavior. In some embodiments, the irradiation control commands may be based, at least in part, on angle of incidence $\theta_i$ of the energy beam 200 and/or elliptical angle $\theta_e$ of the beam spot 300, and/or based at least in part on a relationship between melting and/or sintering behavior and angle of incidence $\theta_i$ of the energy beam 200 and/or elliptical angle $\theta_e$ of the beam spot 300.

Figure 6:
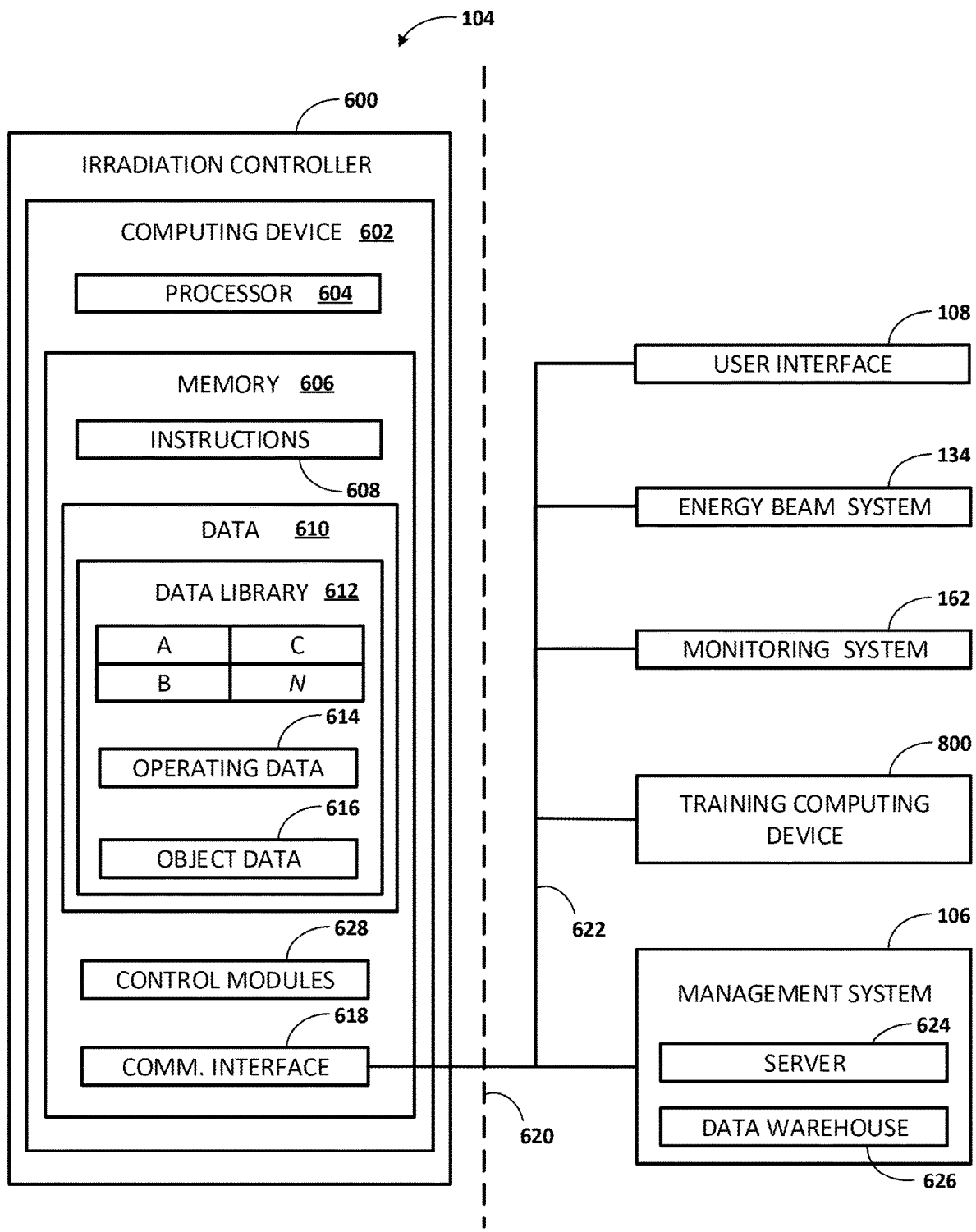
FIG. 6 schematically depicts an exemplary control system that includes an irradiation controller configured to control one or more irradiation parameters.

As shown in FIG. 6, an exemplary control system 104 includes an irradiation controller 600 configured to control one or more irradiation parameters associated with an additive manufacturing machine 102. An irradiation controller 600 may be communicatively coupled with an additive manufacturing machine 102. In some embodiments, the irradiation controller 600 may be communicatively coupled with one or more components of an additive manufacturing machine 102, such as an energy beam system 134 and/or a monitoring system 162. The irradiation controller 600 may also be communicatively coupled with a management system 106 and/or a user interface 108.

The irradiation controller 600 may include one or more computing devices 602, which may be located locally or remotely relative to the additive manufacturing machine 102 and/or a calibration system 250. The one or more computing devices 602 may include one or more processors 604 and one or more memory devices 606. The one or more processors 604 may include any suitable processing device, such as a microprocessor, microcontroller, integrated circuit, logic device, and/or other suitable processing device. The one or more memory devices 606 may include one or more computer-readable media, including but not limited to non-transitory computer-readable media, RAM, ROM, hard drives, flash drives, and/or other memory devices 606.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 606 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 606 may store information accessible by the one or more processors 604, including machine-executable instructions 608 that can be executed by the one or more processors 604. The instructions 608 may include any set of instructions which when executed by the one or more processors 604 cause the one or more processors 604 to perform operations, including additive manufacturing operations, such as controlling and/or monitoring build operations. In some embodiments, the instructions 608 may be configured to cause the one or more processors 604 to perform operations for which the irradiation controller 600 and/or the one or more computing devices 602 are configured, such as controlling and/or monitoring additive manufacturing operations.

The memory devices 606 may store data 610 accessible by the one or more processors 604. The data 610 can include current or real-time data 610, past data 610, or a combination thereof. The data 610 may be stored in a data library 612. As examples, the data 610 may include data 610 associated with or generated by an additive manufacturing system 100 and/or an additive manufacturing machine 102, including data 610 associated with or generated by an irradiation controller 600, an additive manufacturing machine 102, an energy beam system 134, a monitoring system 162, a management system 106, a user interface 108, and/or a computing device 602. Such data 610 may include operating data 614 and/or object data 616. Such operating data 614 may include data 610 associated with operating an additive manufacturing machine 102, such as control commands for operating an additive manufacturing machine 102, including model inputs and/or irradiation control commands for an energy beam system 134, and so forth. Such object data 616 may include data 610 associated with an object or objects 114 to be additively manufactured, such as build files, object slice data, and so forth. The data 610 may also include other data sets, parameters, outputs, information, associated with an additive manufacturing system 100 and/or an additive manufacturing machine 102.

The one or more computing devices 602 may also include a communication interface 618, which may be used for communications with a communication network 620 via wired or wireless communication lines 622. The communication interface 618 may include any suitable components for interfacing with one or more network(s), including for example, transmitters, receivers, ports, controllers, antennas, and/or other suitable components. The communication interface 618 may allow the computing device 602 to communicate with various nodes on the communication network 620, such as nodes associated with the additive manufacturing machine 102, the energy beam system 134, the monitoring system 162, the management system 106, and/or a user interface 108. The communication network 620 may include, for example, a local area network (LAN), a wide area network (WAN), SATCOM network, VHF network, a HF network, a Wi-Fi network, a WiMAX network, a gate-link network, and/or any other suitable communication network 620 for transmitting messages to and/or from the irradiation controller 600 across the communication lines 622. The communication lines 622 of communication network 620 may include a data bus or a combination of wired and/or wireless communication links.

The communication interface 618 may allow the computing device 602 to communicate with various components of an additive manufacturing system 100 and/or an additive manufacturing machine 102 communicatively coupled with the communication interface 618 and/or communicatively coupled with one another, including the energy beam system 134 and/or the monitoring system 162. The communication interface 618 may additionally or alternatively allow the computing device 602 to communicate with the management system 106 and/or the user interface 108. The management system 106 may include a server 624 and/or a data warehouse 626. As an example, at least a portion of the data 610 may be stored in the data warehouse 626, and the server 624 may be configured to transmit data 610 from the data warehouse 626 to the computing device 602, and/or to receive data 610 from the computing device 602 and to store the received data 610 in the data warehouse 626 for further purposes. The server 624 and/or the data warehouse 626 may be implemented as part of a control system 104 and/or as part of the management system 106.

The irradiation controller 600 may include one or more control modules 628, which may utilize the data 610, including the data library 612, and/or other data sets, parameters, outputs, information, associated with the additive manufacturing system 100, such as those associated with the additive manufacturing machine 102, the user interface 108, and/or the management system 106. The one or more control modules 628 may additionally or alternatively utilize data 610 from the data warehouse 626, which may be transmitted to the irradiation controller 600 from the server 624. The control system 104 may be configured to perform operations such as additive manufacturing calibrations and/or control operations. For example, the control system 104 may include one or more control modules 628 to perform control operations, such as those presently disclosed herein. In some embodiments, an irradiation controller 600 may include one or more irradiation control modules. Such an irradiation control module may be configured to determine one or more irradiation control commands, for example, based at least in part on one or more model inputs.

Figure 7A:
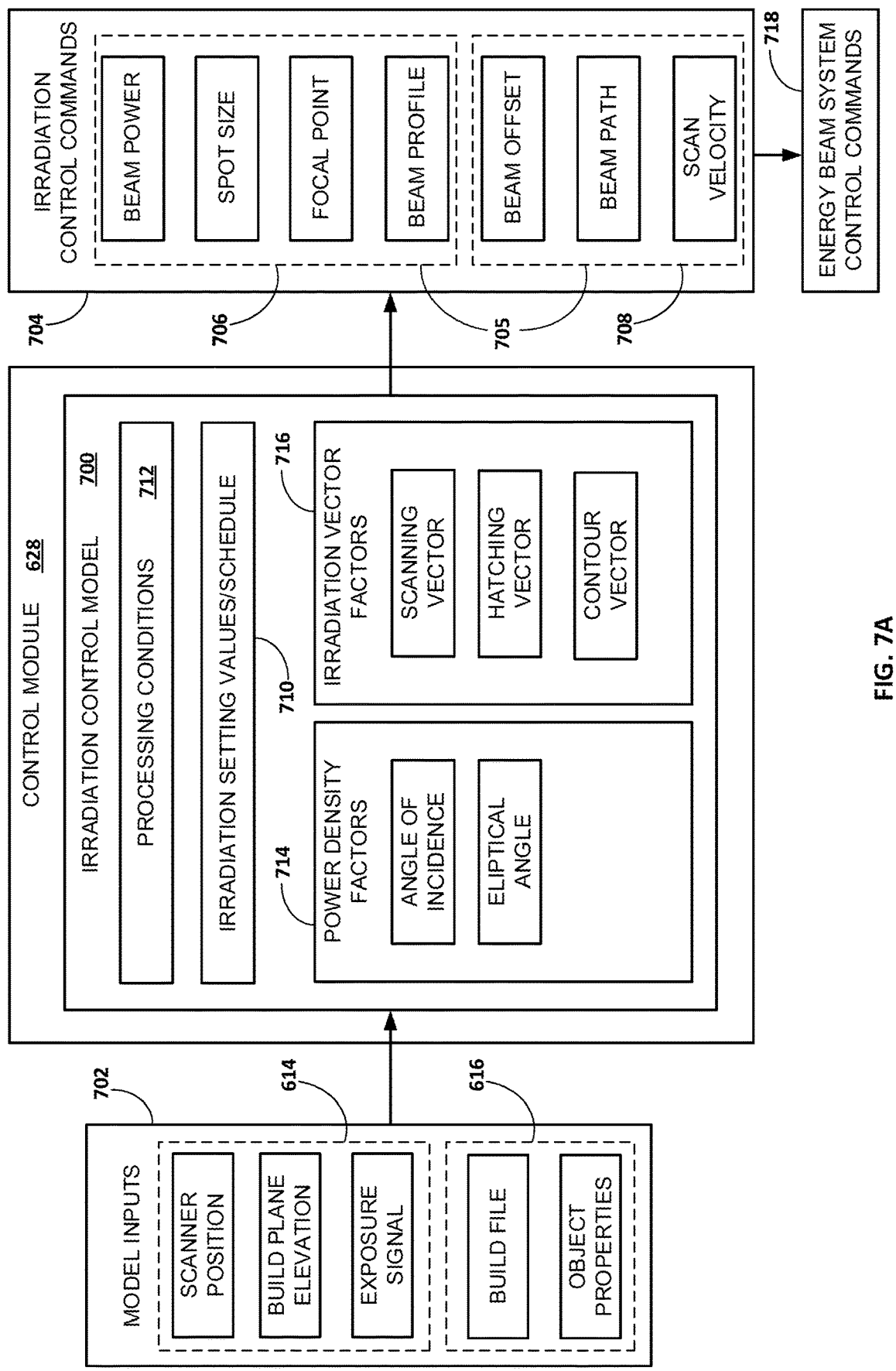
FIGS. 7A and 7B schematically depict exemplary control modules that include an irradiation control model.
Figure 7B:
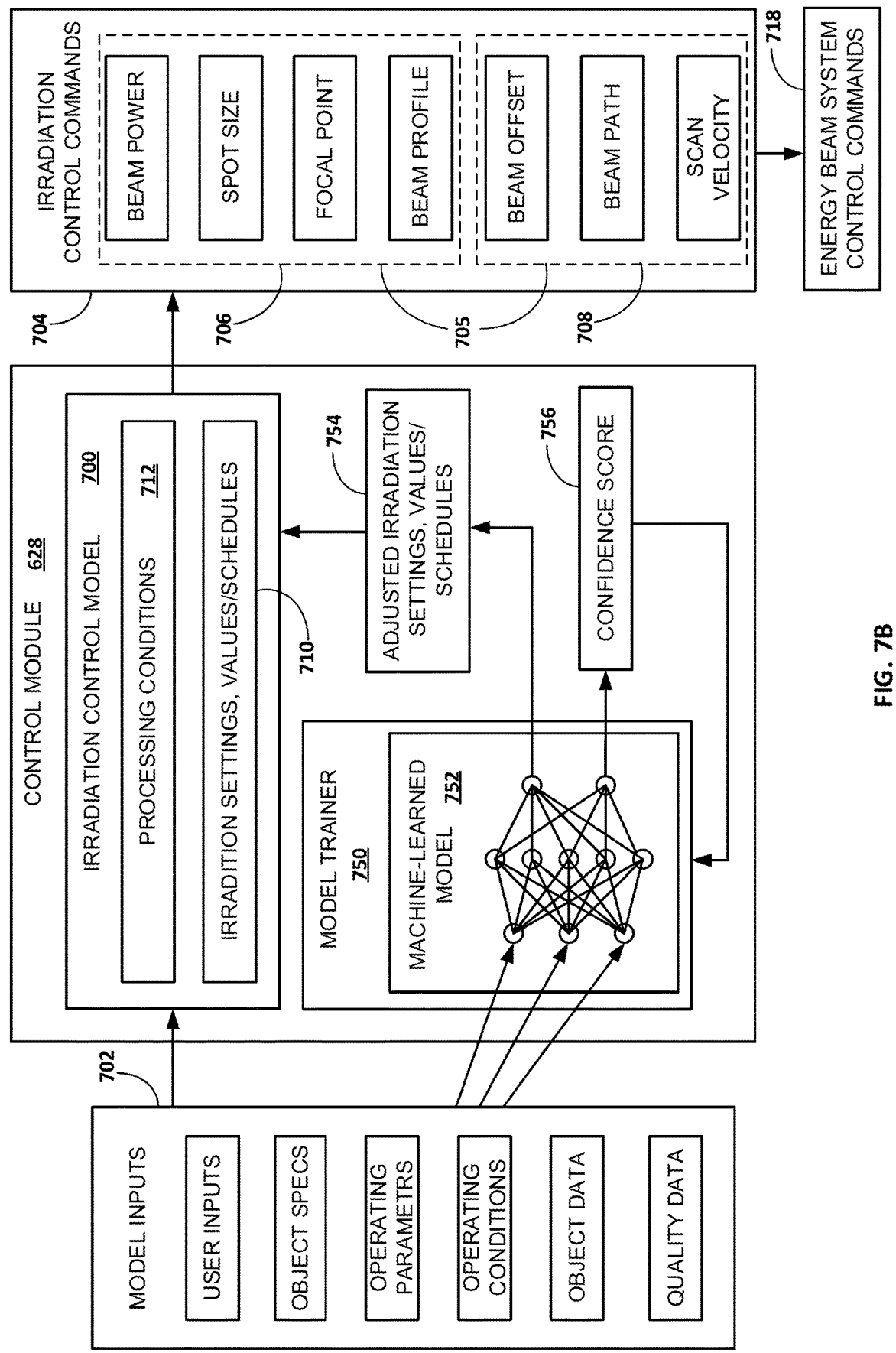

Referring now to FIGS. 7A and 7B, exemplary control modules 628 will be described. An exemplary control module 628 may include one or more irradiation control models 700. The one or more irradiation control models 700 may be configured to control one or more beam parameters, for example, based at least in part on one or more model inputs 702 and/or one or more irradiation control commands 704. The one or more irradiation control commands 704 may include a command configured to change one or more operating parameters of the additive manufacturing machine 102. As shown, an exemplary irradiation control module 700 may be configured to receive one or more model inputs 702. As shown in FIG. 7A, exemplary model inputs 702 include operating data 614 and/or object data 616. One or more irradiation control commands 704 may be determined based at least in part on an irradiation control model 700. The one or more irradiation control commands 704 determined by the irradiation control model 700 may be based at least in part on one or more model inputs 702. Exemplary irradiation control commands 704 may include control commands pertaining to irradiation parameters 705, including beam parameters 706 and/or scanning parameters 708.

Exemplary beam parameters 706 include beam power or intensity, spot size, focal point, beam profile (e.g., intensity profile 202, power density profile 404), and so forth. Beam power parameters may include one or more parameters pertaining to a beam generation device of an energy beam system 134, including one or more parameters configured to impart a desired beam power, beam intensity, and so forth. Spot size parameters may include one or more parameters pertaining to one or more optics devices of an energy beam system 134, including one or more parameters configured to impart a desired spot shape, spot cross-section, and so forth. Scan velocity parameters may include one or more parameters pertaining to a scanner device of an energy beam system 134, including one or more parameters pertaining to position, orientation, and/or movement speed configured to impart a desired beam velocity, hatching velocity, contour velocity, and so forth. Focal point parameters may include one or more parameters pertaining to a beam focusing device of an energy beam system 134, including one or more parameters configured to impart a desired focal point, focal point offset, and so forth. Beam profile parameters may include one or more parameters pertaining to a beam generation device and/or an optics device of an energy beam system 134, including one or more parameters configured to impart a desired energy density profile 302 and/or power density profile 404, and so forth.

Exemplary scanning parameters 708 include beam offset, beam path, scan velocity, and so forth. Beam offset parameters may include one or more parameters pertaining to a scanner device of an energy beam system 134, including one or more parameters pertaining to position, orientation, and/or movement speed configured to impart a desired hatching offset or overlap distance, contour offset or overlap distance, and so forth. Beam path parameters may include one or more parameters pertaining to a scanner device of an energy beam system 134, including one or more parameters pertaining to position and/or orientation configured to impart a desired hatching vector, hatch length, contour vector, contour length, and so forth. Scan velocity parameters may include one or more parameters pertaining to a scanner device of an energy beam system 134, including one or more parameters pertaining to movements of a scanner device configured to impart a desired scanning velocity.

Any number of model inputs 702 may be used by an irradiation control model 700, including current or real-time data 610, past data 610, or a combination thereof. The one or more model inputs 702 may include data 610 associated with or generated by an additive manufacturing system 100, including data 610 associated with or generated by an additive manufacturing machine 102 and/or an additive manufacturing machine 102. Such data 610 associated with an additive manufacturing system 100 may additionally or alternatively including data 610 associated with or generated by a control system 104, a computing device 602, and/or an irradiation control model 700. The model inputs 702 may include data 610 associated with, comprising, or generated by a control system 104, data 610 associated with, comprising, or generated by a computing device 602, and/or data 610 associated with, comprising, or generated by an irradiation control model 700. As shown in FIG. 7A, exemplary model inputs 702 may include scanner position, build plane elevation, and/or a beam exposure signal (e.g., whether the energy beam generation device is currently emitting an energy beam). As shown in FIG. 7B, exemplary model inputs 702 may additionally or alternatively include user inputs; object specifications (e.g., quality specifications, material specifications, composition specifications, etc.); operating data 614 including, for example, operating parameters (e.g., additive manufacturing machine parameters, etc.) and/or operating conditions (e.g., temperatures, gas flow parameters, etc.); object data 616 (e.g., data pertaining to a data file or build file for an object 114 that has been additively manufactured or partially additively manufactured); and/or quality data (e.g., measured and/or calculated martial properties of an object 114, melt-pool monitoring parameters, etc.). The model inputs 702 may themselves be regarded as data 610, which may be stored in the data library 612 and/or the data warehouse 626, and which may be included in subsequent model inputs 702. The model inputs 702 may additionally include other data sets, parameters, outputs, information, etc. shown and/or described herein.

The irradiation control commands 704 may be configured to adjust an irradiation parameter 705 according to a irradiation setting 710. A determined irradiation setting 710 may include one or more values, including a current or real-time value, an average, a maximum, a minimum, and/or a range. The determined irradiation setting 710 may additional include one or more statistical parameters, such as a distribution value (e.g., a variance, a standard deviation) and/or a regression coefficient value. The values and/or schedules for the irradiation settings 710 may be derived or determined from one or more model inputs 702 and/or from the irradiation control model 700.

An irradiation control model 700 may be configured to determine whether an irradiation parameter 705 (e.g., a beam parameter 706 and/or a scanning parameter 708) differs from a irradiation setting 710, such as by at least a threshold level. When the irradiation parameter 705 differs from a irradiation setting 710, such as by at least a threshold level, the irradiation control model 700 may determine an irradiation control command 704 configured to adjust the irradiation parameter 705 towards the irradiation setting 710. In some embodiments, an irradiation control model 700 may perform a compare operation. The compare operation may include one or more operations configured to compare the determined irradiation parameters 705 (e.g., beam parameters 706 and/or scanning parameters 708) to a irradiation setting 710. The compare operation may include a PID controller or any other suitable controller. The compare operation may utilize linear or non-linear control algorithms, and any analytical technique including frequency domain and/or time-domain state space representation techniques.

In some embodiments, one or more irradiation control commands 704 may be determined prior to irradiating a layer of the powder bed 136. For example, beam parameters 706 may be determined prior to commencing additively manufacturing an object 114, and/or prior to irradiating a particular layer of the object 114. Additionally, or in the alternative, one or more irradiation control commands 704 may be determined in real-time, such as while an energy beam 200 is irradiating a respective layer of an object. Such irradiation control commands 704 determined in real-time may be based at least in part on one or more model inputs 702 determined during a time when the energy beam is irradiating a respective layer of an object. Additionally, or in the alternative, such irradiation control commands 704 may be carried out, such as by an energy beam system 134, during a time when the energy beam is irradiating the respective layer of the object. For example, an irradiation control command 704 may be determined based at least in part on one or more model inputs 702 determined during a time when the energy beam is irradiating a respective layer of an object, and carried out during such time when the energy beam is irradiating the respective layer of the object.

Exemplary irradiation control commands 704 that may be determined prior to irradiating a layer of the powder bed 136 and/or prior to commencing additively manufacturing an object 114 include irradiation control commands 704 pertaining to scanning parameters 708, such as irradiation control commands 704 pertaining to beam offset parameters, beam path parameters, or scan velocity parameters, as well as combinations of these. In some embodiments, however, irradiation control commands 704 for any one or more scanning parameters 708 may be determined in real-time, such as in addition or as an alternative to determining such scanning parameters 708 in advance.

Exemplary irradiation control commands 704 that may be determined in real-time include irradiation control commands 704 pertaining to beam parameters 706, such as irradiation control commands 704 pertaining to beam power parameters, spot size parameters, focal point parameters, beam profile parameters, as well as combinations of these. In some embodiments, however, irradiation control commands 704 for any one or more beam parameters 706 may be determined prior to irradiating a layer of the powder bed 136 and/or prior to commencing additively manufacturing an object 114, such as in addition or as an alternative to determining such scanning parameters 708 in real-time.

In some embodiments, an irradiation control model 700 may utilize one or more processing conditions 712. Exemplary processing conditions 712 may include data 610 associated with or comprising one or more operating modes of an additive manufacturing machine 102, as well as sensed, measured, calculated, or predicted conditions internal or external to the additive manufacturing machine 102 which may affect the operation thereof. Such internal conditions include temperatures, pressures, heat transfer rates, gas flow rates, vibration levels, powder types, and so forth. Such external conditions include ambient temperature, pressure, humidity, and so forth. An irradiation control model 700 may additionally or alternatively include one or more irradiation settings 710, which may include setting values and/or setting schedules for one or more irradiation parameters 705, such as beam parameters 706 and/or scanning parameters 708.

Referring to FIG. 7A, in some embodiments, an exemplary control module 628 may include an irradiation control model 700 that includes one or more power density factors 714 and/or one or more irradiation vector factors 716. The irradiation control model 700 may be based at least in part on such one or more power density factors 714 and/or irradiation vector factors 716. The irradiation control model 700 may be configured to determine one or more irradiation control commands 704 based at least in part on the one or more power density factors 714 and/or irradiation vector factors 716. Such power density factors 714 may include angle of incidence $\theta_i$ of an energy beam 200 and/or elliptical angle $\theta_e$ of a beam spot 300. The irradiation control model 700 may be configured to determine one or more power density factors 714 based at least in part on one or more model inputs 702. The one or more model inputs 702 may include operating data 614, such as scanner position, build plane elevation, and/or beam exposure signal (e.g., a signal indicating that a beam generation device is emitting an energy beam). The one or more model inputs 702 may additionally or alternatively include object data 616, such as data 610 associated with a build file and/or object properties such as material composition and/or desired physical properties. In some embodiments, an irradiation control model 700 may be configured to output one or more irradiation control commands 704 based at least in part on one or more model inputs 702 that pertain to operating data 614, such as scanner position, build plane elevation, and beam exposure signal. The one or more control commands 704 may include one or more beam parameters 706, such as one or more parameters pertaining to beam power, spot size, scan velocity, and/or focal point. The one or more irradiation control commands 704 may additionally or alternatively include one or more scanning parameters 708, such as beam offset, beam path, and/or scan velocity.

The irradiation control model 700 may be configured to determine one or more irradiation control commands 704 configured to adjust an energy density and/or a power density of an energy beam 200 based at least in part on the one or more power density factors 714. For example, the irradiation control model 700 may determine an irradiation control command 704 pertaining to a beam power parameter, a spot size parameter, a scan velocity parameter, and/or a focal point parameter. Such irradiation control command 704 may be output to the energy beam system 134, for example, by way of one or more energy beam system control commands 718. The irradiation control commands 704 and/or the energy beam system control command 718 may effect an adjustment to an energy density and/or a power density of an energy beam 200.

In some embodiments, the irradiation control model 700 may be additionally or alternatively configured to determine one or more irradiation control commands 704 based at least in part on one or more irradiation vector factors 716. Such irradiation vector factors 716 may include one or more factors pertaining to an irradiation vector, such as a scanning vector 400, a hatching vector 500, and/or a contour vector 550. The irradiation control model 700 may be configured to determine one or more irradiation vector factors 716 based at least in part on one or more model inputs 702, such as an orientation and/or magnitude of an irradiation vector, such as a scanning vector 400, a hatching vector 500, and/or a contour vector 550, and/or whether the one or more model input 702 and/or the one or more irradiation control commands 704 correspond to an irradiation vector, such as a scanning vector 400, a hatching vector 500, and/or a contour vector 550. In some embodiments, an irradiation control model 700 may be configured to output one or more irradiation control commands 704 based at least in part on one or more model inputs 702 that pertain to an irradiation vector, such as a scanning vector 400, a hatching vector 500, and/or a contour vector 550. Additionally, or in the alternative, the irradiation control model 700 may be configured to determine an irradiation control command 704 based at least in part on whether the one or more model input 702 correspond to an irradiation vector, such as a scanning vector 400, a hatching vector 500, and/or a contour vector 550. The one or more control commands 704 may include one or more scanning parameters 708, such as one or more parameters pertaining to beam power, spot size, scan velocity, and/or focal point.

In some embodiments, an irradiation control model 700 may be additionally or alternatively configured to determine an irradiation control command 704 that pertains to an irradiation vector, such as a scanning vector 400, a hatching vector 500, and/or a contour vector 550. For example, an irradiation control command 704 may be configured to control an orientation and/or magnitude of an irradiation vector, such as a scanning vector 400, a hatching vector 500, and/or a contour vector 550. The orientation and/or magnitude of the irradiation vector (e.g., the scanning vector 400, the hatching vector 500, and/or the contour vector 550) may be determined based at least in part on one or more beam parameters 706 and/or to one or more scanning parameters 708. The orientation and/or magnitude of irradiation vector (e.g., the scanning vector 400, the hatching vector 500, and/or the contour vector 550) may be implemented by one or more irradiation control commands 704 corresponding to on one or more beam parameters 706 and/or to one or more scanning parameters 708. An irradiation control command 704 may be configured to be implemented specifically and/or exclusively during one or more periods corresponding to an irradiation vector, such as a scanning vector 400, a hatching vector 500, and/or a contour vector 550. For example, an irradiation control command 704 may be based at least in part on whether an energy beam 200 is propagating along a scanning vector 400 corresponding to a hatching vector 500 and/or a scanning vector 400 corresponding to a contour vector 550. In some embodiments, one or more irradiation control commands 704 pertaining to one or more beam parameters 706 and/or to one or more scanning parameters 708 may be based at least in part on whether an energy beam 200 is propagating along a scanning vector 400 corresponding to a hatching vector 500 and/or a scanning vector 400 corresponding to a contour vector 550.

The control module 628 may be configured to output the one or more irradiation control commands 704 to an energy beam system 134. For example, the control module 628 may output energy beam system control commands 718 based at least in part on the irradiation control commands 704. The energy beam system control commands 718 may be additionally or alternatively based at least in part on object data 616 such as a CAD file for an object 114 to be additively manufactured and/or a build file or object properties corresponding to and/or determined using the object data 616. In some embodiments, an energy beam system control command 718 may be based on both an irradiation control command 704 and build data from a build file. Additionally or in the alternative, some energy beam system control commands 718 may be based on the build data from a build file and some energy beam system control commands 718 may be based on an irradiation control command 704.

Referring now to FIG. 7B, further aspects of an exemplary control module 628 will be described. As shown in FIG. 7B, in some embodiments, an irradiation control model 700 may include a model trainer 750. The model trainer 750 may use any one or more various training or learning techniques such as backwards propagation of errors, which may include performing truncated backpropagation through time. In some embodiments, supervised training techniques may be used on a set of labeled training data. The model trainer 750 may perform a number of generalization techniques (e.g., weight decays, dropouts, etc.) to improve the generalization capability of the irradiation control model 700 being trained.

An exemplary model trainer 750 may include a machine-learned model 752. The model trainer 750 may utilize one or more model inputs 702 as inputs, including, for example, as inputs to a machine-learned model 752. The model trainer 750 may output one or more adjusted irradiation settings 754. The adjusted irradiation settings 754 may include updates or adjustments to settings, values, and/or schedules already included in the irradiation settings 710. Additionally, or in the alternative, the adjusted irradiation settings 754 may include new settings, values, and/or schedules to be included with or substituted for those already included in the irradiation settings 710. In some embodiments, the machine-learned model 752 may include and/or may be based at least in part on one or more power density factors 714 and/or one or more irradiation vector factors 716. The machine-learned model 752 may be configured to determine one or more irradiation control commands 704 based at least in part on the one or more power density factors 714 and/or irradiation vector factors 716.

A machine-learned model 752 may use any suitable machine learning technique, operating regime, or algorithm.

A machine-learned model 752 may be configured to use pattern recognition, computational learning, artificial intelligence, or the like to derive algorithms that allow the machine-learned model 752 to determine one or more irradiation settings 710. A machine-learned model 752 may include an unsupervised or a supervised learning regime, including a semi-supervised learning regime, an active learning regime, a reinforcement learning regime, and/or a representation learning regime. A machine-learned model 752 may utilize neural networks, decision trees, association rules, inductive logic algorithms, cluster analysis algorithms, and the like. In some embodiments, the model inputs 702 may include data 610 associated with or generated by a machine-learned model 752.

By way of example, the machine-learned model 752 shown in FIG. 7B includes a neural network. However, an exemplary machine-learned model 752 may include any other suitable model, including a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, and combinations thereof. Even further additional suitable types of machine or statistical learning models are also contemplated. It will also be appreciated that the machine-learned model 752 can use certain mathematical methods alone or in combination with one or more machine or statistical learning models.

In addition to outputting an adjusted irradiation settings 754, in some embodiments an irradiation control model 700 (e.g., a machine-learned model 752) may output a confidence score 756, which may provide an indication as to a level of confidence attributable to one or more outputs of the machine-learned model 752. The confidence score 756 can be used, for example, to set a margin of error to be used by the irradiation control model 700 in determining an adjusted irradiation settings 754. For example, in the event of a low confidence score 756 the irradiation control model 700 may account for a more conservative or wide margin for error when determining an adjusted irradiation settings 754, whereas in the event of a high confidence score 756 the irradiation control model 700 may allow for a more aggressive or narrow margin for error when determining an adjusted irradiation settings 754. In some embodiments, the model inputs 702 may include data 610 associated with or comprising a confidence score 756.

Figure 8:
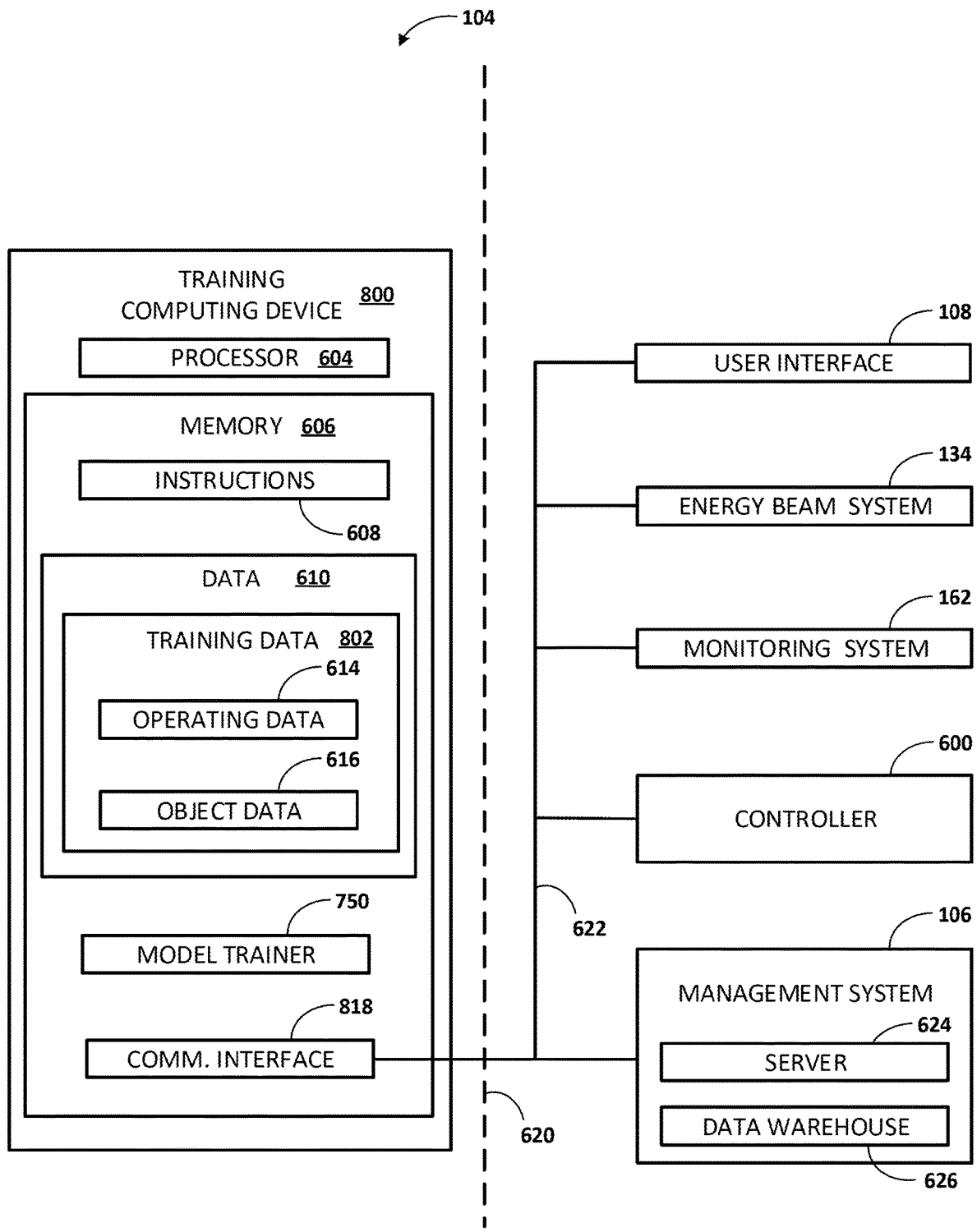
FIG. 8 schematically depicts an exemplary training computing device for training a machine-learned model.

Now referring to FIG. 8, an exemplary training computing device 800 will be described. In some embodiments, a training computing device 800 may be used to train an irradiation control model 700, such as to train a machine-learned model 752.

The training computing device 800 may be communicatively coupled with the irradiation controller 600 via the communication network 620. Alternatively, the training computing device 800 may be included as a part of the irradiation controller 600. For example, the training computing device 800 may be part of the computing device 602 included as part of the irradiation controller 600. The training computing device 800 may include one or more processors 604 and one or more memory devices 606. The one or more memory devices 606 may store information accessible by the one or more processors 604, including computer-readable instructions 608 that may be executed by the one or more processors 604. The memory devices 606 may additionally or alternatively store data 610 that may be accessed by the one or more processors 604. The training computing device 800 can also include a communication interface 618 configured to communicate with resources on the communication network 620. The hardware, implementation, and functionality of the components of the training computing device 800 may operate, function, and include the same or similar components as those described with respect to the one or more computing devices 602 of the irradiation controller 600.

The training computing device 800 may include a model trainer 750 configured to train one or more irradiation control models 700, such as a machine-learned model 752. In some embodiments, the model trainer 750 can train one or more irradiation control models 700 based on a set of training data 802. The training data 802 may include past operating data 614 and/or object data 616 for objects previously additively manufactured. In some embodiments, the training data 802 may include at least a portion of the data library 612. Alternatively, the data library 612 may include the training data 802 or at least a portion thereof.

The model trainer 750 may utilize past operating data 614 to train one or more irradiation control models 700 with respect to how the additive manufacturing machine 102 has been actually and/or uniquely operated in the past with respect to object specifications and/or operating parameters, such as under particular operating conditions and/or such as in relation to the objects 114 additively manufactured and/or resulting quality data. Additionally, or in the alternative, the model trainer 750 may utilize past operating data 614 to validate or test an irradiation control model 700, including a machine-learned model 752.

Figure 9:
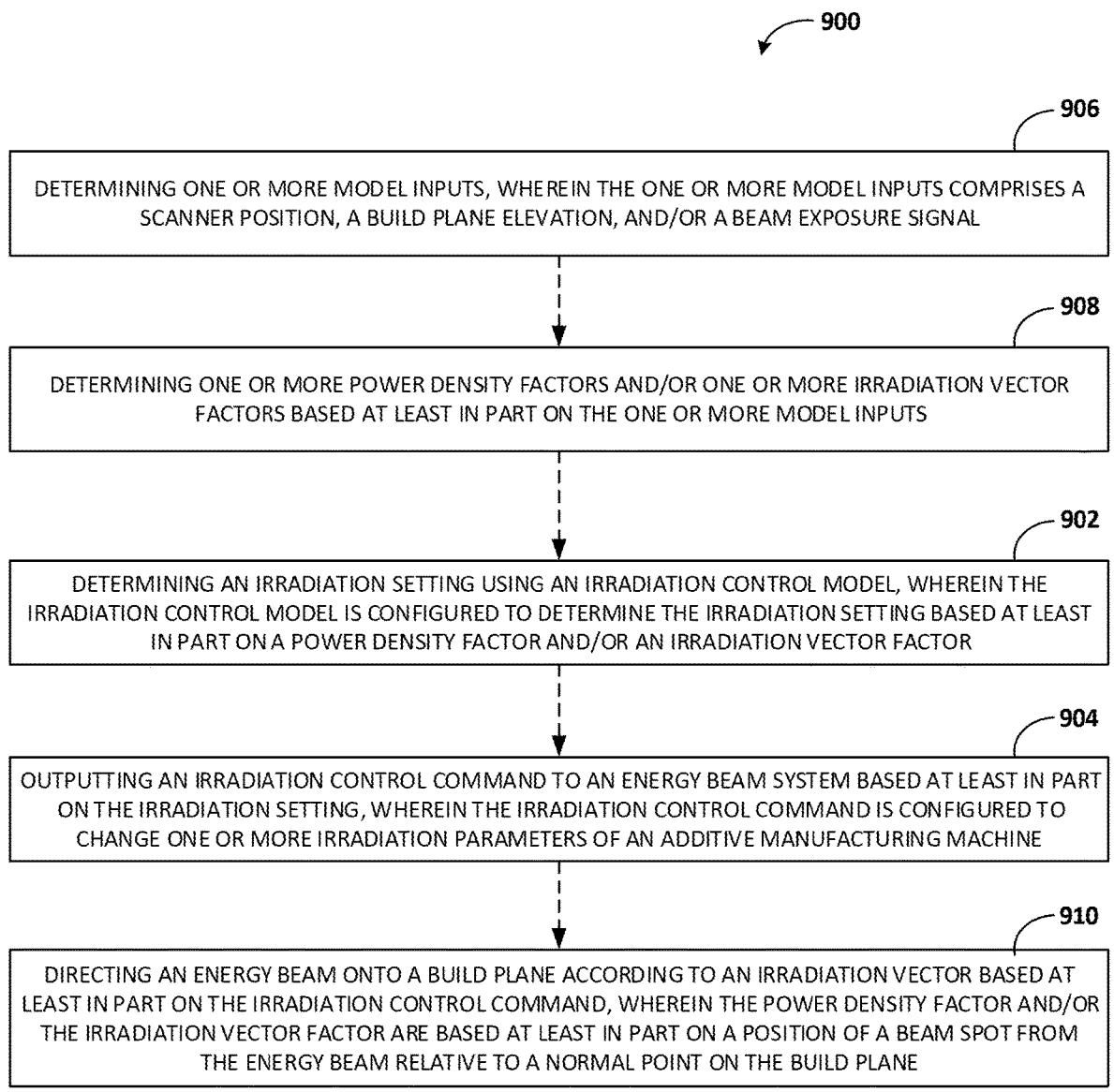
FIG. 9 shows a flow chart depicting an exemplary method of additively manufacturing a three-dimensional object, such as a method of controlling an irradiation parameter of an of an additive manufacturing machine.

Now turning to FIG. 9, exemplary methods of additively manufacturing a three-dimensional object 114 will be described, including methods of controlling an irradiation parameter 705 of an of an additive manufacturing machine 102. As shown in FIG. 9, an exemplary method 900 may include, at block, 902, determining an irradiation setting 710 using an irradiation control model 700. The irradiation control model 700 is configured to determine the irradiation setting 710 based at least in part on a power density factor 714 and/or a irradiation vector factor 716. At block 904, an exemplary method 900 may additionally or alternatively include outputting an irradiation control command 704 to an energy beam system 134 based at least in part on the irradiation setting 710. The irradiation control command 704 is configured to change one or more irradiation parameters 705 for additively manufacturing a three-dimensional object 114, such as one or more irradiation parameters 705 of an additive manufacturing machine 102 and/or one or more irradiation parameters 705 of an energy beam system 134.

In some embodiments, an exemplary method 900 may include, at block 906, determining one or more model inputs 702. The one or more model inputs 702 may include a scanner position, a build plane elevation, and/or a beam exposure signal. An exemplary method 900 may additionally or alternatively include, at block 908, determining one or more power density factors 714 and/or one or more irradiation vector factors 716 based at least in part on the one or more model inputs 702. Additionally, or in the alternative, at block 910, an exemplary method 900 may include directing an energy beam 200 onto a build plane 130 according to an irradiation vector (e.g., a scanning vector 400, a hatching vector 500, and/or a contour vector 550) based at least in part on the irradiation control command 704. The power density factor 714 and/or the irradiation vector factor 716 may be based at least in part on a position of a beam spot 300 from the energy beam 200 relative to a normal point 206 on the build plane 130.

Further aspects of the invention are provided by the subject matter of the following clauses:

1. A method of additively manufacturing a three-dimensional object, the method comprising: determining an irradiation setting using an irradiation control model, wherein the irradiation control model is configured to determine the irradiation setting based at least in part on a power density factor and/or an irradiation vector factor; and outputting an irradiation control command to an energy beam system based at least in part on the irradiation setting, wherein the irradiation control command is configured to change one or more irradiation parameters for additively manufacturing a three-dimensional object.

2. The method of any preceding clause, comprising: determining one or more model inputs, wherein the one or more model inputs comprises a scanner position, a build plane elevation, and/or a beam exposure signal.

3. The method of any preceding clause, comprising: determining the power density factor and/or the irradiation vector factor based at least in part on one or more model inputs.

4. The method of any preceding clause, comprising: directing an energy beam onto a build plane according to a scanning vector based at least in part on the irradiation control command, wherein the power density factor and/or the irradiation vector factor are based at least in part on a position of a beam spot from the energy beam relative to a normal point on the build plane.

5. The method of any preceding clause, wherein determining an irradiation setting comprises: determining a first irradiation setting for a first position on the build plane, wherein the first irradiation setting is determined based at least in part on an angle of incidence of the energy beam corresponding to the first position on the build plane and/or based at least in part on a location of the first position of the build plane relative to a normal point on the build plane; and/or determining a second irradiation setting for a second position on the build plane, wherein the second irradiation setting is determined based at least in part on an angle of incidence of the energy beam corresponding to the second position on the build plane and/or based at least in part on a location of the second position of the build plane relative to a normal point on the build plane.

6. The method of any preceding clause, wherein the irradiation setting comprises one or more beam parameters and/or one or more scanning parameters; wherein the one or more beam parameters pertains to one or more of: beam power, spot size, focal point, or beam profile; and/or wherein the one or more scanning parameters pertains to one or more of: beam offset, beam path, or scan velocity.

7. The method of any preceding clause, comprising: changing one or more irradiation parameters of an additive manufacturing machine based at least in part on an angle of incidence of the energy beam and/or a location of a beam spot from the energy beam on the build plane relative to a normal point on the build plane.

8. The method of any preceding clause, comprising: determining the irradiation setting based at least in part on one or more model inputs to the irradiation control model, wherein the one or more model inputs comprises a scanner position and a build plane elevation; and directing an energy beam onto a build plane according to a scanning vector based at least in part on the irradiation control command, wherein the irradiation control command pertains to beam power, spot size, scan velocity, and/or focal point, and wherein the irradiation control command and/or at least one of the one or more model inputs are determined in real-time; or directing an energy beam onto a build plane according to a scanning vector based at least in part on an additional irradiation control command, wherein the additional irradiation control command pertains to beam profile, beam offset, and/or beam path, and wherein the additional irradiation control command and/or at least one of the one or more model inputs are determined prior to commencing to irradiate a layer of the powder bed defining the build plane and/or prior to commencing additively manufacturing a three-dimensional object.

9. The method of any preceding clause, wherein the irradiation control model comprises a machine-learned model.

10. An additive manufacturing system, comprising: an energy beam system; and a control system comprising an irradiation controller; wherein the irradiation controller comprises a control module configured to perform a method of controlling one or more irradiation parameters of the energy beam system, the method comprising: determining an irradiation setting using an irradiation control model, wherein the irradiation control model is configured to determine the irradiation setting based at least in part on a power density factor and/or an irradiation vector factor; and outputting an irradiation control command to the energy beam system based at least in part on the irradiation setting, wherein the irradiation control command is configured to change one or more irradiation parameters for additively manufacturing a three-dimensional object.

11. The additive manufacturing system of any preceding clause, comprising: determining one or more model inputs, wherein the one or more model inputs comprises a scanner position, a build plane elevation, and/or a beam exposure signal.

12. The additive manufacturing system of any preceding clause, comprising: determining the power density factor and/or the irradiation vector factor based at least in part on the one or more model inputs.

13. The additive manufacturing system of any preceding clause, comprising: directing an energy beam onto a build plane according to a scanning vector based at least in part on the irradiation control command, wherein the power density factor and/or the irradiation vector factor are based at least in part on a position of a beam spot from the energy beam relative to a normal point on the build plane.

14. The additive manufacturing system of any preceding clause, wherein determining an irradiation setting comprises: determining a first irradiation setting for a first position on the build plane, wherein the first irradiation setting is determined based at least in part on an angle of incidence of the energy beam corresponding to the first position on the build plane and/or based at least in part on a location of the first position of the build plane relative to a normal point on the build plane; and/or determining a second irradiation setting for a second position on the build plane, wherein the second irradiation setting is determined based at least in part on an angle of incidence of the energy beam corresponding to the second position on the build plane and/or based at least in part on a location of the second position of the build plane relative to a normal point on the build plane.

15. The additive manufacturing system of any preceding clause, wherein the irradiation setting comprises one or more beam parameters and/or one or more scanning parameters; wherein the one or more beam parameters pertains to one or more of: beam power, spot size, focal point, or beam profile; and/or wherein the one or more scanning parameters pertains to one or more of: beam offset, beam path, or scan velocity.

16. The additive manufacturing system of any preceding clause, wherein determining an irradiation setting comprises: changing one or more irradiation parameters of the energy beam system based at least in part on an angle of incidence of the energy beam and/or a location of a beam spot from the energy beam on the build plane relative to a normal point on the build plane.

17. The additive manufacturing system of any preceding clause, wherein: determining an irradiation setting comprises: determining the irradiation setting based at least in part on one or more model inputs to the irradiation control model, wherein the one or more model inputs comprises a scanner position and a build plane elevation; and outputting an irradiation control command comprises: directing an energy beam onto a build plane according to a scanning vector based at least in part on the irradiation control command, wherein the irradiation control command pertains to beam power, spot size, scan velocity, and/or focal point, and wherein the irradiation control command and/or at least one of the one or more model inputs are determined in real-time.

18. The additive manufacturing system of any preceding clause, wherein outputting an irradiation control command comprises: directing the energy beam onto a build plane according to the scanning vector based at least in part on an additional irradiation control command, wherein the additional irradiation control command pertains to beam profile, beam offset, and/or beam path, and wherein the additional irradiation control command and/or at least one of the one or more model inputs are determined prior to commencing to irradiate a layer of the powder bed defining the build plane and/or prior to commencing additively manufacturing a three-dimensional object.

19. The additive manufacturing system of any preceding clause, wherein the irradiation control model comprises a machine-learned model.

20. The additive manufacturing system of any preceding clause, configured to perform the method of any preceding clause.

21. A computer-readable medium comprising computer-executable instructions, which when executed by a processor, cause the processor to perform a method comprising: determining an irradiation setting using an irradiation control model, wherein the irradiation control model is configured to determine the irradiation setting based at least in part on a power density factor and/or an irradiation vector factor; and outputting an irradiation control command to an energy beam system based at least in part on the irradiation setting, wherein the irradiation control command is configured to change one or more irradiation parameters for additively manufacturing a three-dimensional object.

22. The computer-readable medium of any preceding clause, comprising computer-executable instructions, which when executed by a processor, cause the processor to perform the method of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A non-transitory computer-readable medium comprising computer-executable instructions, which when executed by a processor, cause the processor to perform a method of additively manufacturing a three-dimensional object, the method comprising:
    determining an irradiation setting using an irradiation control model, wherein the irradiation control model is configured to determine the irradiation setting based at least in part on a power density factor and/or an irradiation vector factor;
    outputting an irradiation control command to an energy beam system based at least in part on the irradiation setting, wherein the irradiation control command is configured to change one or more irradiation parameters for additively manufacturing a three-dimensional object; and
    directing an energy beam onto a build plane according to a scanning vector based at least in part on the irradiation control command, wherein the power density factor and/or the irradiation vector factor are based at least in part on a position of a beam spot from the energy beam relative to a normal point on the build plane.

2. The non-transitory computer-readable medium of claim 1, wherein the computer-executable instructions, when executed by a processor, cause the processor to further perform the method of additively manufacturing a three-dimensional object, the method further comprising:
    determining one or more model inputs, wherein the one or more model inputs comprises a scanner position, a build plane elevation, and/or a beam exposure signal.

3. The non-transitory computer-readable medium of claim 1, wherein the computer-executable instructions, when executed by a processor, cause the processor to further perform the method of additively manufacturing a three-dimensional object, the method further comprising:
    determining the power density factor and/or the irradiation vector factor based at least in part on one or more model inputs.

4. The non-transitory computer-readable medium of claim 1, wherein determining an irradiation setting comprises:
    determining a first irradiation setting for a first position on the build plane, wherein the first irradiation setting is determined based at least in part on an angle of incidence of the energy beam corresponding to the first position on the build plane and/or based at least in part on a location of the first position of the build plane relative to the normal point on the build plane; and/or
    determining a second irradiation setting for a second position on the build plane, wherein the second irradiation setting is determined based at least in part on an angle of incidence of the energy beam corresponding to the second position on the build plane and/or based at least in part on a location of the second position of the build plane relative to the normal point on the build plane.

5. The non-transitory computer-readable medium of claim 1, wherein the irradiation setting comprises one or more beam parameters and/or one or more scanning parameters;
    wherein the one or more beam parameters pertain to one or more of: beam power, spot size, focal point, or beam profile; and/or
    wherein the one or more scanning parameters pertains to one or more of: beam offset, beam path, or scan velocity.

6. The non-transitory computer-readable medium of claim 1, wherein the computer-executable instructions, when executed by a processor, cause the processor to further perform the method of additively manufacturing a three-dimensional object, the method further comprising:
    changing one or more irradiation parameters of an additive manufacturing machine based at least in part on an angle of incidence of the energy beam and/or a location of a beam spot from the energy beam on the build plane relative to the normal point on the build plane.

7. The non-transitory computer-readable medium of claim 1, wherein the computer-executable instructions, when executed by a processor, cause the processor to further perform the method of additively manufacturing a three-dimensional object, the method further comprising:
    determining the irradiation setting based at least in part on one or more model inputs to the irradiation control model, wherein the one or more model inputs comprises a scanner position and a build plane elevation; and
    directing the energy beam onto the build plane according to the scanning vector based at least in part on the irradiation control command, wherein the irradiation control command pertains to beam power, spot size, scan velocity, and/or focal point, and wherein the irradiation control command and/or at least one of the one or more model inputs are determined in real-time; or
    directing the energy beam onto the build plane according to the scanning vector based at least in part on an additional irradiation control command, wherein the additional irradiation control command pertains to beam profile, beam offset, and/or beam path, and wherein the additional irradiation control command and/or at least one of the one or more model inputs are determined prior to commencing to irradiate a layer of a powder bed defining the build plane and/or prior to commencing additively manufacturing a three-dimensional object.

8. The non-transitory computer-readable medium of claim 1, wherein the irradiation control model comprises a machine-learned model.

9. An additive manufacturing system, comprising:
    an energy beam system; and
    a control system comprising an irradiation controller;
    wherein the irradiation controller comprises a control module configured to perform a method of controlling one or more irradiation parameters of the energy beam system, the method comprising:
        determining an irradiation setting using an irradiation control model, wherein the irradiation control model is configured to determine the irradiation setting based at least in part on a power density factor and/or an irradiation vector factor;
        outputting an irradiation control command to the energy beam system based at least in part on the irradiation setting, wherein the irradiation control command is configured to change one or more irradiation parameters for additively manufacturing a three-dimensional object; and directing an energy beam onto a build plane according to a scanning vector based at least in part on the irradiation control command, wherein the power density factor and/or the irradiation vector factor are based at least in part on a position of a beam spot from the energy beam relative to a normal point on the build plane.

10. The additive manufacturing system of claim 9, comprising:
determining one or more model inputs, wherein the one or more model inputs comprises a scanner position, a build plane elevation, and/or a beam exposure signal.

11. The additive manufacturing system of claim 10, comprising:
determining the power density factor and/or the irradiation vector factor based at least in part on the one or more model inputs.

12. The additive manufacturing system of claim 9, wherein determining an irradiation setting comprises:
determining a first irradiation setting for a first position on the build plane, wherein the first irradiation setting is determined based at least in part on an angle of incidence of the energy beam corresponding to the first position on the build plane and/or based at least in part on a location of the first position of the build plane relative to the normal point on the build plane; and/or
determining a second irradiation setting for a second position on the build plane, wherein the second irradiation setting is determined based at least in part on an angle of incidence of the energy beam corresponding to the second position on the build plane and/or based at least in part on a location of the second position of the build plane relative to the normal point on the build plane.

13. The additive manufacturing system of claim 9, wherein the irradiation setting comprises one or more beam parameters and/or one or more scanning parameters;
wherein the one or more beam parameters pertain to one or more of: beam power, spot size, focal point, or beam profile; and/or
wherein the one or more scanning parameters pertains to one or more of: beam offset, beam path, or scan velocity.

14. The additive manufacturing system of claim 9, wherein determining an irradiation setting comprises:
changing one or more irradiation parameters of the energy beam system based at least in part on an angle of incidence of the energy beam and/or a location of a beam spot from the energy beam on a build plane relative to the normal point on the build plane.

15. The additive manufacturing system of claim 9, wherein:
determining an irradiation setting comprises: determining the irradiation setting based at least in part on one or more model inputs to the irradiation control model, wherein the one or more model inputs comprises a scanner position and a build plane elevation; and
outputting an irradiation control command comprises: directing the energy beam onto the build plane according to the scanning vector based at least in part on the irradiation control command, wherein the irradiation control command pertains to beam power, spot size, scan velocity, and/or focal point, and wherein the irradiation control command and/or at least one of the one or more model inputs are determined in real-time.

16. The additive manufacturing system of claim 15, wherein outputting an irradiation control command comprises:
directing the energy beam onto the build plane according to the scanning vector based at least in part on an additional irradiation control command, wherein the additional irradiation control command pertains to beam profile, beam offset, and/or beam path, and wherein the additional irradiation control command and/or at least one of the one or more model inputs are determined prior to commencing to irradiate a layer of a powder bed defining the build plane and/or prior to commencing additively manufacturing a three-dimensional object.

17. The additive manufacturing system of claim 9, wherein the irradiation control model comprises a machine-learned model.

18. A method of additively manufacturing a three-dimensional object, the method comprising:
determining an irradiation setting using an irradiation control model, wherein the irradiation control model is configured to determine the irradiation setting based at least in part on a power density factor and/or an irradiation vector factor;
outputting an irradiation control command to an energy beam system based at least in part on the irradiation setting, wherein the irradiation control command is configured to change one or more irradiation parameters for additively manufacturing a three-dimensional object; and
directing an energy beam onto a build plane according to a scanning vector based at least in part on the irradiation control command, wherein the power density factor and/or the irradiation vector factor are based at least in part on a position of a beam spot from the energy beam relative to a normal point on the build plane.

* * * * *